US012724144B2

(12) United States Patent
Luo et al.

(10) Patent No.: US 12,724,144 B2
(45) Date of Patent: Sep. 1, 2026

(54) SEGMENTED APERTURE IMAGING AND POSITIONING METHOD OF MULTI-ROTOR UNMANNED AERIAL VEHICLE-BORNE SYNTHETIC APERTURE RADAR

(71) Applicant: FUDAN UNIVERSITY, Shanghai (CN)

(72) Inventors: Meiyixiang Luo, Shanghai (CN); Feng Xu, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 302 days.

(21) Appl. No.: 18/576,667

(22) PCT Filed: Sep. 1, 2021

(86) PCT No.: PCT/CN2021/115882
§ 371 (c)(1),
(2) Date: Jan. 4, 2024

(87) PCT Pub. No.: WO2023/015623
PCT Pub. Date: Feb. 16, 2023

(65) Prior Publication Data

US 2024/0319364 A1 Sep. 26, 2024

(30) Foreign Application Priority Data

Aug. 13, 2021 (CN) ........................ 202110929813.9

(51) Int. Cl.
*G01S 13/90* (2006.01)

(52) U.S. Cl.
CPC ....... *G01S 13/9011* (2013.01); *G01S 13/9021* (2019.05); *G01S 13/9041* (2019.05)

(58) Field of Classification Search
None
See application file for complete search history.

(56) References Cited

FOREIGN PATENT DOCUMENTS

| | | |
|---|---|---|
| CN | 104020471 A | 9/2014 |
| CN | 108344982 A | 7/2018 |

(Continued)

OTHER PUBLICATIONS

Jia Wang et al., "An Imaging Algorithm for High Squint Missile-borne SAR Based on Block Processing." Guidance & Fuze, Sep. 20, 2013, pp. 32-36, vol. 34., No. 3.

*Primary Examiner* — Ladimir Magloire
*Assistant Examiner* — Ashley Brown Taynal
(74) *Attorney, Agent, or Firm* — H&I PARTNERS; Chai Im; C. Andrew Im

(57) ABSTRACT

A segmented aperture imaging/positioning method of a multi-rotor unmanned aerial radar. A target echo is acquired based on an unmanned aerial vehicle-borne synthetic aperture radar system. An echo signal estimated from the motion state of a manoeuvring platform is segmented. Motion compensation is performed on each echo signal segment. A two-dimensional spectrum is obtained by performing a two-dimensional Fourier transform on each compensated echo signal segment. A series inversion method to decompose the two-dimensional spectrum is used to obtain a phase filter of each segment. The two-dimensional spectrum of each segment is multiplied by the phase filter, and an image of each segment is obtained by performing two-dimensional inverse Fourier transform on the two-dimensional spectrum. A full-aperture imaging result is obtained by performing geometric corrections on the images and splicing them. The trajectory of each segment of the platform is spliced to obtain complete trajectory coordinates of the platform.

10 Claims, 11 Drawing Sheets

(56) References Cited

FOREIGN PATENT DOCUMENTS

| | | | | | |
|---|---|---|---|---|---|
| CN | 109655831 A | | 4/2019 | | |
| CN | 111190181 A | * | 5/2020 | ......... | G01S 13/9019 |
| JP | 2012093257 A | | 5/2012 | | |

* cited by examiner

SEGMENTED APERTURE IMAGING AND POSITIONING METHOD OF MULTI-ROTOR UNMANNED AERIAL VEHICLE-BORNE SYNTHETIC APERTURE RADAR

RELATED APPLICATIONS

This application is a § 371 application of PCT/CN2021/115882 filed Sep. 1, 2021, which claims priority from Chinese Patent Application No. 202110929813.9 filed Aug. 13, 2021, each of which is incorporated herein by reference in its entirety.

TECHNICAL FIELD

This invention belongs to the field of signal processing technology, specifically relating to a segmented aperture imaging and positioning method of a multi-rotor unmanned aerial vehicle-borne synthetic aperture radar.

BACKGROUND OF THE INVENTION

With the extensive application of remote sensing technology in civil applications such as map surveying and mapping, surface deformation detection of terrestrial objects, and weather observation, the miniaturization of remote sensing equipment has become an inevitable trend. Since the 1990s, due to their small size, portability, flexibility, and ease of operation, unmanned aerial vehicle platforms have gradually become an important platform for synthetic aperture radar, with many scholars conducting extensive research on unmanned aerial vehicle platform synthetic aperture radar systems from both the system design and imaging algorithm perspectives. In recent years, with the development of unmanned aerial vehicle navigation and control technologies, various models of multi-rotor unmanned aerial vehicles have flooded the market. However, they have not been widely used in the field of remote sensing. The primary reason is that the traditional aircraft-mounted imaging algorithms are unstable when applied to the imaging of synthetic aperture radar carried by multi-rotor unmanned aerial vehicles, being constrained by the performance of the inertial equipment they carry. Therefore, researching imaging algorithms for synthetic aperture radar carried by multi-rotor unmanned aerial vehicles that are not dependent on inertial equipment is of significant importance.

Currently, research institutions domestically and internationally primarily rely on airborne imaging algorithms that depend on data obtained from high-precision inertial navigation systems for motion compensation and imaging. Additionally, due to the servo systems carried by large platforms, which can compensate in real-time for the effects brought by changes in platform attitude angles, there is no need to consider the variations in platform angles. Therefore, it fails to address three issues present in the multi-rotor unmanned aerial vehicle carrying synthetic aperture radar systems: 1) The trajectory of multi-rotor platforms is usually very unstable because it is easily affected by environmental factors such as wind, possibly leading to severe jitters and abrupt turns; 2) The unique flight principles of multi-rotors bring about high-frequency errors and incidence angle errors due to rotor vibrations and fuselage tilting operations; 3) The combination of high-maneuverability trajectories with low-cost inertial navigation systems results in rather poor motion status and attitude angle data used for motion compensation. Moreover, due to the limitations of load capacity of the unmanned aerial vehicles, high-precision inertial navigation devices cannot be carried, resulting in a decrease in the positioning accuracy of navigation systems of the unmanned aerial vehicles. If the aerial vehicles' trajectory is reconstructed based on imaging results during flight, basis can be provide for their navigation systems. Therefore, studying the imaging and positioning algorithms of the multi-rotor unmanned aerial vehicle-borne synthetic aperture radar is of great significance.

OBJECT AND SUMMARY OF THE INVENTION

This invention is targeted at the shortcomings and deficiencies of existing airborne imaging algorithms. Its objective is to provide segmented aperture imaging (SAI) and positioning method of a multi-rotor unmanned aerial vehicle synthetic aperture radar. This method is suitable for synthetic aperture radar systems without inertial navigation equipment or with low-precision inertial navigation equipment, aiming to enhance the focusing effect and imaging efficiency of radar imaging. This invention offers a SAI method for synthetic aperture radar carried by multi-rotor unmanned aerial vehicles. This method is used for progressive imaging based on the echo signals of the synthetic aperture radar, characterized by the following steps: Step 1, perform range pulse compression on the raw echo signal $s(t, \eta)$ to obtain a range pulse compression signal $s_{RC}(t, \eta)$, where t is the fast time in range dimension, and $\eta$ is the slow time in azimuth dimension. On the basis of the phase history $\varphi(\eta)$ of strong scattering points in the range pulse compression signal $s_{RC}(t, \eta)$, calculate the estimated velocity $\hat{v}$ and estimated squint angle of the beam center $\hat{\theta}$ of the manoeuvring platform; Step 2, on the basis of the direction of the estimated velocity $\hat{v}$, segment the range pulse compression signal $s_{RC}(t, \eta)$ into N segments, with each segment corresponding to the segmented pulse compression signal $s_{RC,i}(t, \eta)$, where i=1 . . . N; Step 3, based on the estimated velocity $\hat{v}$ and the estimated squint angle of the beam center $\hat{\theta}$, calculate the phase compensation amount $\varphi_{m,i}$ of each segmented pulse compression signal $s_{RC,i}(t, \eta)$. Multiply the segmented pulse compression signal $s_{RC,i}(t, \eta)$ by the motion error compensation filter $H_{MC,i}=\exp(-j\varphi_{m,i})$, where the imaginary unit $j=\sqrt{-1}$, obtaining N compensated echo signal of each segment denoted as $s_{MC,i}(t, \eta)$; Step 4, perform a two-dimensional Fourier transform on the compensated signal $s_{MC,i}(t, \eta)$ to obtain the two-dimensional spectrum $s_{MC,i}(f, f_d)$. Utilize the series inversion method to decompose the two-dimensional spectrum $s_{MC,i}(f, f_d)$, constructing azimuth compression filter $H_{AC,i}$, where f represents the frequency corresponding to the fast time t in range dimension and $f_d$ represents the Doppler frequency corresponding to the slow time $\eta$ in azimuth dimension; Step 5, multiply the two-dimensional spectrum $s_{MC,i}(f, f_d)$ by the azimuth compression filter $H_{AC,i}$, and then perform a two-dimensional inverse Fourier transform to obtain N imaging results, represented as $s_{IMG,i}(t, \eta)$ of each segment; Step 6, sequentially, for the overlapping areas in the imaging result $s_{IMG,i}(t, \eta)$ corresponding to adjacent segments, align and coherent integrate the envelopes in the range dimension where the strong focus points are located. For the non-overlapping areas, perform splicing to obtain the final imaging result, denoted as $S_{all}$.

The SAI method for synthetic aperture radar carried by multi-rotor unmanned aerial vehicles provided by this invention can also have the following characteristics: Within Step 1, for the strong scattering points in the range pulse compression signal $S_{RC}(t, \eta)$, perform a second-order fitting on the phase history $\varphi(\eta)$ to obtain the phase history of the strong scattering points in the slow time in azimuth dimension as $\varphi(\eta)=\beta\eta^2+\alpha\eta+\varphi_0+o(\eta)$, where, t is the fast time in range dimension, $\eta$ is the slow time in azimuth dimension, $o(\eta)$ represents higher order phase errors and $\varphi_0$ is a constant phase term. On the basis of the coefficients of the second-order term $\beta$ and the first-order term $\alpha$, the estimated velocity of the manoeuvring platform is calculated as $$\hat{v}=\sqrt{\left(\frac{\lambda\alpha}{4\pi}\right)^2+\frac{-\lambda\beta\hat{R}}{2\pi}}$$

and the estimated squint angle of the beam center is calculated as $$\hat{\theta}=\tan^{-1}\left(\frac{\lambda\alpha}{4\pi}\Big/\sqrt{\frac{-\lambda\beta\hat{R}}{2\pi}}\right),$$

where $\lambda$ is the wavelength of the system transmitted signal and $\hat{R}$ is the estimated value of the system reference range.

The SAI method for synthetic aperture radar carried by multi-rotor unmanned aerial vehicles provided by this invention can also have the following characteristics: Within Step 2, on the basis of the direction of the estimated velocity $\hat{v}$, the range pulse compression signal $s_{RC}(t, \eta)$ is sequentially divided into N segments with consistent velocity directions. Then, it is determined whether the length of each segment is less than one synthetic aperture length. If it is less, the segment is extended on both sides to one synthetic aperture length. Finally, N segmental echo signals are obtained, denoted $s_{RC,i}(t, \eta)$ of each segment, where i=1 . . . N.

The SAI method for synthetic aperture radar carried by multi-rotor unmanned aerial vehicles provided by this invention can also have the following characteristics: Within Step 3, the phase compensation amount of each segment is derived a $$\varphi_{m,i}=\frac{4\pi}{\lambda}(\hat{R}-R_0+(\hat{v}-v_0)\sin\theta_0\eta),$$

where $R_0$ is the mean value of each segment $\hat{R}$, $\theta_0$ is the mean value of the estimated squint angle of beam center of each segment $\hat{\theta}$.

The SAI method for synthetic aperture radar carried by multi-rotor unmanned aerial vehicles provided by this invention can also have the following characteristics: Within Step 4, the azimuth compression filter of each segment is defined as $$H_{AC,i}=\exp\left[-j\left(\frac{\pi c\hat{R}}{2\hat{v}^2\cos^2\hat{\theta}}\cdot\frac{f_d^2}{f_c^2}+\frac{\pi c\hat{R}}{2\hat{v}^2\cos^2\hat{\theta}}\cdot\frac{f}{f_c^2}f_d^2\right)\right],$$

where f corresponds to the frequency associated with the fast time t in range dimension, $f_d$ is the Doppler frequency corresponding to the slow time $\eta$ in azimuth dimension, $f_e$ is the carrier frequency of the system transmitted signal and c is the speed of light.

The SAI method for synthetic aperture radar carried by multi-rotor unmanned aerial vehicles provided by this invention can also have the following characteristics: Within Step 6, firstly, geometric corrections are applied to the imaging result $s_{IMG,i}(t, \eta)$ corresponding to the adjacent sections, obtaining the corrected imaging result $$s_{IMG,i}^{GC}.$$

Subsequently, the corrected imaging result $$s_{IMG,i}^{GC}$$

is rotated by $\theta-\theta_0$ degrees, obtaining the corrected imaging result $$s_{IMG,i}^{GC}$$

perpendicular to the trajectory of the manoeuvring platform in slant distance. Then, consecutive overlapping areas of the corrected imaging result $$s_{IMG,i}^{GC}$$

corresponding to adjacent sections are aligned in the range dimension envelopes where the strong focus points are located, and coherent integration is performed. For the non-overlapping areas, splicing is executed, obtaining the final imaging result $S_{all}$.

The SAI method for synthetic aperture radar carried by multi-rotor unmanned aerial vehicles provided by this invention can also have the following characteristics. Within Step 6, involving the geometric correction of the imaging result $s_{IMG,i}$, performs as follows in sub-steps: Step 6-1, perform the Fourier transformation in the azimuth dimension on the imaging result $s_{IMG,i}(t, \eta)$. This process will yield a result of each segment in the range-Doppler domain, represented as $s_{IMG,i}(t, f_d)$; Step 6-2, on the basis of the characteristics of Fourier transformation and the geometric structure of the target space, construct the expression for a tilt correction filter to correct the tilt of the image:

$$H_{GC-1}=\exp\left(j2\pi f_d\frac{l\tan\theta_0}{v_0}\right),$$

where l represents the range scale of a typical building; Step 6-3, multiply the range-Doppler domain image $s_{IMG,i}(t, f_d)$ by the tilt correction filter $H_{GC-1}$, obtaining the tilt-corrected frequency domain image $$s_{IMG,i}^{GC-1}(t, f_d);$$

Step 6-4, perform the inverse Fourier transform in the azimuth dimension on the tilt-corrected frequency domain image $$s_{IMG,i}^{GC-1}(t, f_d),$$

obtaining the tilt-corrected time domain image $$s_{IMG,i}^{GC-1}(t,\eta);$$

Step 6-5, on the basis of the geometric structure of the target space, obtain the expression for the stretch/compression factor:

$$t=\frac{l\sin\theta_0}{\sqrt{\hat{R}^2+H^2}-R_0}\frac{1}{\tan\theta_0}t;$$

Step 6-6, substitute the stretch/compression factor expression into the already tilt-corrected time domain image $$s_{IMG,i}^{GC-1}(t,\eta),$$

obtaining the deformation-corrected time domain image $$s_{IMG,i}^{GC-2}(t,\eta);$$

Step 6-7, perform the Fourier transform in range dimension on the deformation-corrected time domain image $$s_{IMG,i}^{GC-2}(t,\eta),$$

obtaining the deformation-corrected frequency domain image $$s_{IMG,i}^{GC-2}(f,\eta);$$

Step 6-8, on the basis of the characteristics of the Fourier transform and the geometric structure of the target space, construct the expression for a secondary position correction filter to correct image translation:

$$H_{GC-3}=\exp\left(j2\pi f\frac{2(\hat{R}/\cos\theta_0-\hat{R})}{c}\right);$$

Step 6-9, multiply the deformation-corrected frequency domain image $$s_{IMG,i}^{GC-2}(f,\eta)$$

by the position correction filter $H_{GC-3}$, to obtain the geometrically corrected frequency domain image $$s_{IMG,i}^{GC-3}(f,\eta);$$

Step 6-10, perform the inverse Fourier transform in the range dimension on the geometrically corrected frequency domain image of each segment $$s_{IMG,i}^{GC-3}(f,\eta),$$

to obtain the geometrically corrected time-domain image of each segment, denoted as $$s_{IMG,i}^{GC}(t,\eta);$$

Step 6-11, rotating the geometrically corrected time-domain image $$s_{IMG,i}^{GC}(t,\eta)$$

counterclockwise by $\hat{\theta}-\theta_0$ degrees to obtain the to-be-spliced time-domain image $$s_{IMG,i}^{GC-p}(t,\eta),$$

which is perpendicular to the trajectory of the manoeuvring platform in slant distance; Step 6-12, sequentially align the envelopes in the range dimension where the strong focus points are located in the overlap regions of the adjacent to-be-spliced time-domain images $$s_{IMG,i}^{GC-p}(t,\eta);$$

Step 6-13, perform coherent integration in the overlapping regions and sequentially connect the non-overlapping regions, completing sub-aperture splicing and obtaining the full-aperture imaging result $S_{all}$.

The SAI method for synthetic aperture radar carried by multi-rotor unmanned aerial vehicles provided by this invention can also have the following characteristics. In Step 1, the estimated velocity $\hat{\theta}$ and the estimated squint angle of the beam center $\hat{\theta}$ are calculated as follows: Step 1-1, based on the definitions of the Doppler frequency modulation slope $K_a$ and the Doppler center $f_{dc}$, the expressions for calculating $K_a$ and $f_{dc}$ are obtained as follows:

$$K_a=\frac{d^2\varphi(\eta)}{2\pi d\eta^2},$$

$$f_{dc}=\frac{d\varphi(\eta)}{2\pi d\eta},$$

where $$\frac{d(\cdot)}{d\eta}$$

denotes the derivation of (•) with respect to the slow time in azimuth κ; Step 1-2, designate the space constituted by the echo signal as the signal space. For the range pulse compression signal $s_{RC}(t, \eta)$, perform a second-order fitting on the phase history $\varphi(\eta)$ of the strong scattering points, obtaining the expression of such strong scatterers in the signal space as follows: $\varphi(\eta)=\beta\eta^2+\alpha\eta+\varphi_0+o(\eta)$, where $\beta$ is the coefficient of the second-order term, $\alpha$ is the coefficient of the first-order term, $\varphi_0$ is the constant phase term and $o(\eta)$ represents the higher-order phase error; Step 1-3, substitute the expression of the phase history $\varphi(\eta)$ into the calculation formulas of $K_a$ and $f_{dc}$ in Step 1-1, respectively, obtaining the expressions of $K_a$ and $f_{dc}$ in the signal space as follows:

$$K_a = \frac{\beta}{\pi},$$

$$f_{dc} = \frac{a}{2\pi};$$

Step 1-4, define the space constructed by the actual positions of the target and the manoeuvring platform as the target space. On the basis of spatial geometric relationships, the expression for the phase history $\varphi(\eta)$ in the target space is obtained as follows:

$$\varphi(\eta) = \frac{4\pi}{\lambda}\left[\frac{v^2\cos^2\theta}{2R_0}\eta^2 - v\sin\theta\,\eta + R_0\right],$$

where $v$ represents the velocity of the manoeuvring platform, $\theta$ represents the squint angle of the beam center caused by the movement of the manoeuvring platform, $R_0$ represents the closest range between the target and the manoeuvring platform and $\lambda$ represents the wavelength of the system transmitted signal; Step 1-5, Substitute the expression for the phase history $\varphi(\eta)$ from the target space into the calculations of $K_a$ and $f_{dc}$ in Step 1-1, to obtain the expressions for $K_a$ and $f_{dc}$ in the target space as follows:

$$K_a = -\frac{2v^2\cos^2\theta}{\lambda R},$$

$$f_{dc} = \frac{2v\sin\theta}{\lambda};$$

Step 1-6, by comparing the right side of the expression of $K_a$ in the signal space with that in the target space, and comparing the right side of the expression of $f_{dc}$ in the signal space with that in the target space, the estimated velocity, estimated squint angle of the beam center, and estimated range are obtained as follows:

$$\hat{v} = \sqrt{\left(\frac{\lambda a}{4\pi}\right)^2 + \frac{-\lambda\beta\hat{R}}{2\pi}},$$

$$\hat{\theta} = \tan^{-1}\left(\frac{\lambda a}{4\pi} \Big/ \sqrt{\frac{-\lambda\beta\hat{R}}{2\pi}}\right),$$

$$\hat{R} = R_0 + \frac{\varphi_0\lambda}{4\pi} - \frac{\lambda\alpha}{8\pi}.$$

The SAI method for synthetic aperture radar carried by multi-rotor unmanned aerial vehicles provided by this invention can also have the following characteristics. In Step 4, the process of decomposing the two-dimensional spectrum of each segment $s_{MC,i}(f, f_d)$ to obtain the expression of the azimuth compression filter of the corresponding segment $H_{AC,i}$ using the series inversion method is performed as follows in sub-steps: Step 4-2-1, on the basis of the stationary phase method, the expression of the two-dimensional spectrum of each segment $s_{MC,i}(f, f_d)$ corresponding to the segment is obtained as:

$$s_{MC,i}(f, f_d) = \exp\left[-j\left(-\frac{4\pi R}{c}(f+f_c) + \frac{\pi cR}{2v^2\cos^2\theta}\cdot\frac{1}{f+f_c}f_d^2\right)\right],$$

where $f_c$ represents the carrier frequency of the system transmitted signal and c represents the speed of light; Step 4-2-2, Using the series inversion method, decompose the expression of the two-dimensional spectrum $s_{MC,i}(f, f_d)$ in Step 4-2-1 to obtain the two-dimensional spectrum expression of each segment that eliminates the coupling terms between f and $$f_d:\ s_{MC,i}(f, f_d) = \exp\left[-j\left(-\frac{4\pi R}{c}(f+f_c) + \frac{\pi cR}{2v^2\cos^2\theta}\cdot\frac{f_d^2}{f_c^2} + \frac{\pi cR}{2v^2\cos^2\theta}\cdot\frac{f}{f_c^2}f_d^2\right)\right];$$

Step 4-2-3, on the basis of the two-dimensional spectrum expression obtained in Step 4-2-2, derive the expression of the ideal phase filter:

$$H_i = \exp\left[-j\left(\frac{\pi cR}{2v^2\cos^2\theta}\cdot\frac{f_d^2}{f_c^2} + \frac{\pi cR}{2v^2\cos^2\theta}\cdot\frac{f}{f_c^2}f_d^2\right)\right];$$

Step 4-2-4, substitute the estimated velocity $\hat{v}$, estimated squint angle of the beam center $\hat{\theta}$ and estimated reference range $\hat{R}$ into the expression of the ideal phase filter to obtained the azimuth compression filter expression of each segment $$H_{AC,i} = \exp\left[-j\left(\frac{\pi c\hat{R}}{2\hat{v}^2\cos^2\hat{\theta}}\cdot\frac{f_d^2}{f_c^2} + \frac{\pi c\hat{R}}{2\hat{v}^2\cos^2\hat{\theta}}\cdot\frac{f}{f_c^2}f_d^2\right)\right].$$

The present invention also provides a positioning method for an unmanned aerial vehicle-borne synthetic aperture radar. This method is used to calculate the flight trajectory of the unmanned aerial vehicle platform based on the raw echo signal from the synthetic aperture radar thereof. It is characterized by the following steps: Step S1, perform range pulse compression on the raw echo signal $s(t, \eta)$ to obtain the range pulse compression signal $s_{RC}(t, \eta)$, and based on the phase history $\varphi(\eta)$ of strong scattering points in the $s_{RC}(t, \eta)$, calculate the estimated velocity $\hat{v}$ and estimated squint angle of the beam center $\hat{\theta}$; Step S2, on the basis of the direction of the estimated velocity $\hat{v}$, segment the range pulse compression signal $s_{RC}(t, \eta)$ into N segments, with each segment corresponding to the segmented pulse compression signal $s_{RC}(t, \eta)$, where i=1 . . . N. Additionally, calculate the platform trajectory coordinates $$[X_k^i, Y_k^i, Z_k^i]$$

for the i-th segment based on the estimated velocity $\hat{v}$ and estimated the squint angle of beam center $\hat{\theta}$, where k=1 . . . M and M is the length of each segment in the azimuth direction. The coordinates are calculated as follows:

$$X_k^i = \int \hat{v}\eta d\eta,\ Y_k^i = 0,\ Z_k^i = \hat{R}\cos\hat{\theta}\cos\theta_{in},$$

where $\theta_{in}$ represents the angle between the beam direction of synthetic aperture radar and the normal direction of the ground plane; Step S3, in the adjacent regions between the i-th and (i−1)-th segments, extract three strong scattering points. The coordinates of the strong scattering points in the i-th segment are denoted as $$[Q_1^i, Q_2^i, Q_3^i],$$

and the coordinates of the strong scattering points in the (i−1)-th segment are denoted as $$[Q_1^{i-1}, Q_2^{i-1}, Q_3^{i-1}];$$

Step S4, calculate the rotation matrix γ for the i-th and (i−1)-th segments based on the coordinates of the strong scattering points $$[Q_1^{i-1}, Q_2^{i-1}, Q_3^{i-1}]$$

and $$[Q_1^i, Q_2^i, Q_3^i].$$

The rotation matrix γ is computed as follows: γ=

$$[Q_1^{i-1}, Q_2^{i-1}, Q_3^{i-1}]\cdot[Q_1^i, Q_2^i, Q_3^i]^{-1};$$

Step S5, use the platform trajectory coordinates of the (i−1)-th segment $$[X_k^{i-1}, Y_k^{i-1}, Z_k^{i-1}]$$

as the reference to rotate the platform trajectory coordinates of the i-th segment. This rotation aligns the platform trajectory coordinates of adjacent segments, ensuring that:

$$[X_k^{i-1}, Y_k^{i-1}, Z_k^{i-1}] = \gamma\cdot[X_k^i, Y_k^i, Z_k^i];$$

Step S6, perform coherent integration of the platform trajectory coordinates in the overlapping region of the i-th and (i−1)-th segments, and concatenate the platform trajectory coordinates in the non-overlapping region to obtain the concatenated trajectory coordinates $$[P_x^i, P_y^i, P_z^i],\ [P_x^i, P_y^i, P_z^i] = [X_k^i, Y_k^i, Z_k^i] + [X_k^{i-1}, Y_k^{i-1}, Z_k^{i-1}];$$

Step S7, repeat steps S3 through S6 until the spliced trajectory coordinates $[P_x, P_y, P_z]$ for all segments are obtained, so as to obtain the final trajectory coordinates of the platform $$[P_x^{all}, P_y^{all}, P_z^{all}].$$

The segmented aperture imaging and positioning method of a multi-rotor unmanned aerial vehicle-borne synthetic aperture radar disclosed in this invention utilize the estimation of platform motion parameters based on the phase history of echo signals and the segmentation of echo signals to precisely compensate for platform motion errors. This results in superior imaging focus and a higher imaging success rate. It enhances the efficiency of data acquisition on multi-rotor unmanned aerial vehicle platforms and enables high-resolution imaging for synthetic aperture radar systems mounted on multi-rotor unmanned aerial vehicle platforms. And during the imaging, the platform trajectory can be effectively estimated to obtain the coordinate information of the platform relative to the measurement area, achieving the effect of platform positioning.

Compared to prior art, the present invention has the following advantages:

Compared to traditional airborne synthetic aperture radar imaging algorithms, this invention considers the relationship between platform motion and signal phase. As a result, it is suitable for synthetic aperture radar imaging systems on multi-rotor unmanned aerial vehicle platforms that lack inertial navigation systems or are equipped with low-precision inertial navigation systems devices.

Compared to traditional airborne synthetic aperture radar imaging algorithms, this invention considers the slant effects caused by variations in the attitude angles of the unmanned aerial vehicle platform and compensates for the coupling phase of range and azimuth, thereby improving image focusing quality. Consequently, this method is suitable for synthetic aperture radar imaging systems on unmanned aerial vehicle platforms that do not employ antenna servo mechanisms, as it effectively addresses the slant effects and enhances imaging quality.

Compared to traditional airborne synthetic aperture radar imaging algorithms, this invention utilizes the method of phase filter multiplication instead of interpolation. This approach enhances the imaging speed for each segment, thus improving the efficiency of single-pass imaging within each segment.

Compared to traditional airborne synthetic aperture radar imaging algorithms, this invention adopts a method of parallel imaging of each segment and then splicing it into a complete image to obtain the image, which improves the imaging speed of the complete image.

Compared to traditional airborne synthetic aperture radar imaging algorithms, this invention can estimate the position of the platform while imaging, achieving the effect of platform positioning and facilitating the establishment of an automated, intelligent, and integrated unmanned aerial vehicle detection system.

DETAILED DESCRIPTION OF THE EMBODIMENTS

Figure 1:
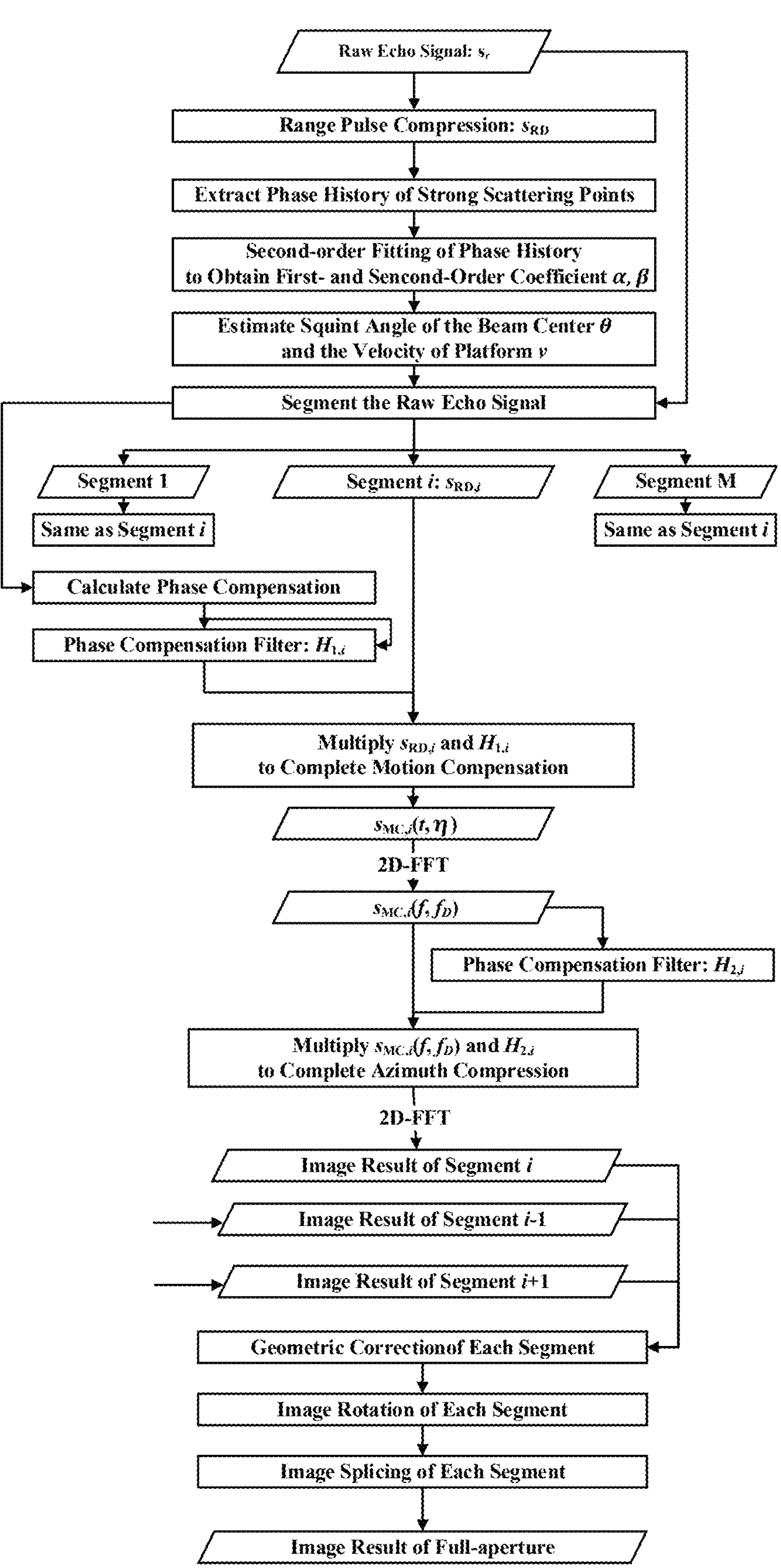
FIG. 1. Flowchart of an embodiment of the present invention.
Figure 2:
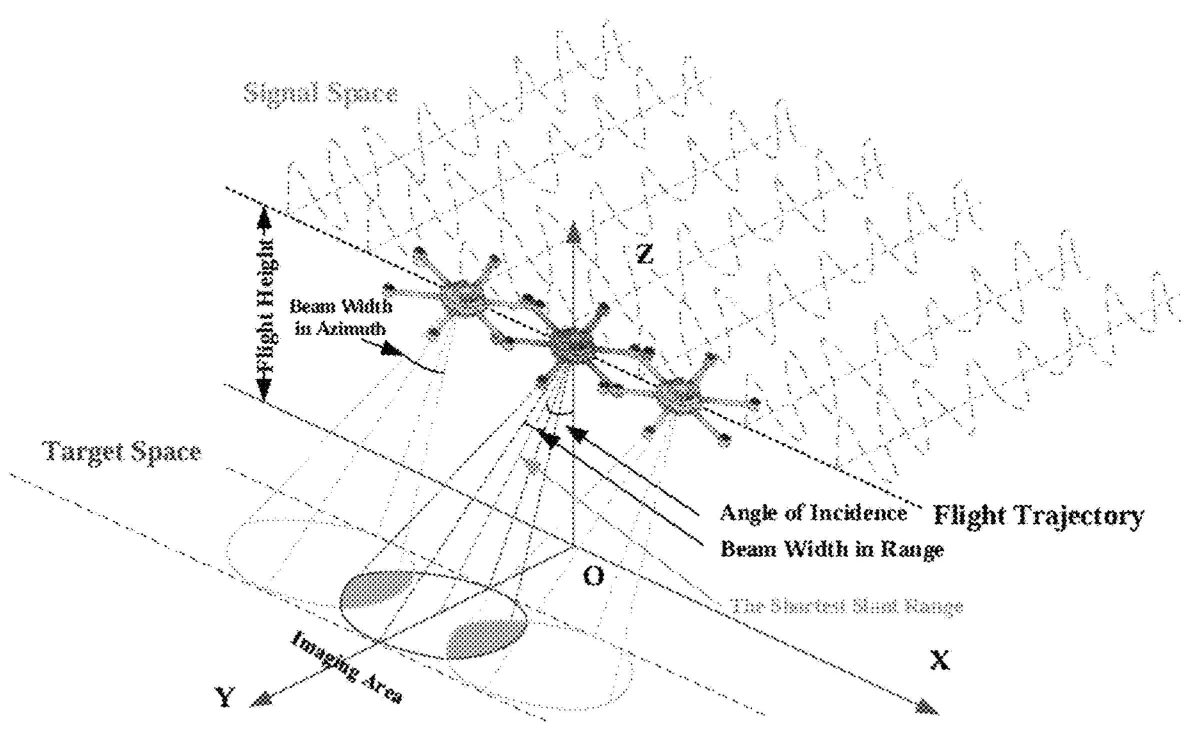
FIG. 2. Schematic diagram of the target space and signal space in an embodiment of the present invention's airborne synthetic aperture radar system.

In order to make the technical means, creative features, objectives, and effects of this invention easy to understand, the following provides a detailed explanation of a segmented aperture imaging and positioning method of a multi-rotor unmanned aerial vehicle-borne synthetic aperture radar, in conjunction with examples and accompanying figures.

In the present invention, after the unmanned aerial vehicle takes off, the unmanned aerial vehicle-borne synthetic aperture radar transmits a linear frequency-modulated signal with a carrier frequency of $f_c$, through a transmitted antenna. The transmitted signal, after being scattered by a target, is received by the radar through a receiving antenna, resulting in the raw echo signal $s(t, \eta)$, where t is the fast time related to range dimension, and n is the slow time related to azimuth dimension. The synthetic aperture length $L_s$ is given by $L_s=R\theta_{BW}$, where R is the reference range, and $\eta_{BW}$ is beam width of the azimuth.

The invention provides a segmented aperture imaging and positioning method of a multi-rotor unmanned aerial vehicle-borne synthetic aperture radar. This method is used for the segmented aperture imaging based on the raw echo signal of a unmanned aerial vehicle-carried synthetic aperture radar, and includes the following steps:

Step 1, perform range pulse compression on the raw echo signal $s(t, \eta)$ to obtain a range pulse compression signal $s_{RC}(t, \eta)$, where t is the fast time in range dimension, and $\eta$ is the slow time in azimuth dimension. On the basis of the phase history $\varphi(\eta)$ of strong scattering points in the range pulse compression signal $s_{RC}(t, \eta)$, the estimated velocity $\hat{v}$ and estimated squint angle of the beam center $\hat{\theta}$ are calculated;

Step 2, on the basis of the direction of the estimated velocity $\hat{v}$, segment the range pulse compression signal $s_{RC}(t, \eta)$ into N segments, with each segment corresponding to the echo signal $s_{RC}(t, \eta)$, where i=1 . . . N;

Step 3, based on the estimated velocity $\hat{v}$ and the estimated squint angle of the beam center $\hat{\theta}$, calculate the value of the phase compensation $\varphi_{m,i}$ for echo signal of each segment $s_{RC}(t, \eta)$. Multiply the echo signal of each segment $s_{RC,i}(t, \eta)$ by the motion error compensation filter $H_{MC,i}=\exp(-j\varphi_{m,i})$, where the imaginary unit $j=\sqrt{-1}$, obtaining N compensated echo signal of each segment denoted as $s_{MC,i}(t, \eta)$;

Step 4, perform a two-dimensional Fourier transform on the compensated echo signal of each segment $s_{MC,i}(t, \eta)$ to obtain the two-dimensional spectrum of each segment $s_{MC,i}(f, f_d)$. Utilize the series inversion method to decompose the two-dimensional spectrum of each segment $s_{MC,i}(f, f_d)$, constructing azimuth compression filter of each segment $H_{AC,i}$, where f represents the frequency corresponding to the fast time t in range dimension and $f_d$ represents the Doppler frequency corresponding to the slow time $\eta$ in azimuth dimension;

Step 5, multiply the two-dimensional spectrum of each segment $s_{MC,i}(f, f_d)$ by the azimuth compression filter of each segment $H_{AC,i}$, and then perform a two-dimensional inverse Fourier transform to obtain N imaging results, represented as $s_{IMG,i}(t, \eta)$ of each segment;

Step 6, sequentially, for the overlapping areas in the imaging result of each segment $s_{IMG,i}(t, \eta)$ corresponding to adjacent segments, align and coherent integrate the envelopes in the range dimension where the strong focus points are located. For the non-overlapping areas, perform splicing to obtain the final full-aperture imaging result, denoted as $S_{all}$.

Within Step 1, for the strong scattering points in the range pulse compression signal $s_{RC}(t, \eta)$, perform a second-order fitting on the phase history $\varphi(\eta)$ to obtain the phase history of the strong scattering points in the slow time in azimuth dimension as $\varphi(\eta)=\beta\eta^2\alpha\eta+\varphi_0+0(\eta)$, where, t is the fast time in range dimension, $\eta$ is the slow time in azimuth dimension, $0(\eta)$ represents higher order phase errors and $\varphi_0$ is a constant phase term. On the basis of the coefficients of the second-order term $\beta$ and the first-order term $\alpha$, the estimated velocity of the manoeuvring platform is calculated as $$\hat{v} = \sqrt{\left(\frac{\lambda a}{4\pi}\right) + \frac{-\lambda\beta\hat{R}}{2\pi}}$$

and the estimated squint angle of the beam center is calculated as $$\hat{\theta} = \tan^{-1}\left(\frac{\lambda a}{4\pi} \Big/ \sqrt{\frac{-\lambda\beta\hat{R}}{2\pi}}\right),$$

where $\lambda$ is the wavelength of the transmitted signal and $\hat{R}$ is the estimated value of the reference range.

Within Step 2, on the basis of the direction of the estimated velocity $\hat{v}$, the range pulse compression signal $s_{RC}(t, \eta)$ is sequentially divided into N segments with consistent velocity directions. Then, it is determined whether the length of each segment is less than one synthetic aperture length. If it is less, the segment is extended on both sides to one synthetic aperture length. Finally, N segmented pulse compression signals can be obtained, denoted $s_{RC}(t, \eta)$ of each segment, where i=1 . . . N.

Within Step 3, the phase compensation amount of each segment is defined as $$\varphi_{m,i} = \frac{4\pi}{\lambda}(\hat{R} - R_0 + (\hat{v} - v_0)\sin\theta_0\,\eta),$$

where $R_0$ is the mean value of each segment $\hat{R}$, $\theta_0$ is the mean value of the estimated squint angle of beam center of each segment $\hat{\theta}$.

Within Step 4, the azimuth compression filter of each segment is defined as $$H_{AC,i} = \exp\left[-j\left(\frac{\pi c\hat{R}}{2\hat{v}^2\cos^2\hat{\theta}}\cdot\frac{f_d^2}{f_c^2} + \frac{\pi c\hat{R}}{2\hat{v}^2\cos^2\hat{\theta}}\cdot\frac{f}{f_c^2}f_d^2\right)\right],$$

where f corresponds to the frequency associated with the fast time t in range dimension, $f_d$ is the Doppler frequency corresponding to the slow time $\eta$ in azimuth dimension, $f_c$ is the carrier frequency of the system transmitted signal and c is the speed of light.

Within Step 6, firstly, geometric corrections are applied to the imaging result $s_{IMG,i}(t, \eta)$ corresponding to the adjacent sections, obtaining the corrected imaging result $$s_{IMG,i}^{GC}.$$

Subsequently, the corrected imaging result $$s_{IMG,i}^{GC}$$

are rotated by $\hat{\theta}-\theta_0$ degrees, obtaining the corrected imaging result $$s_{IMG,i}^{GC}$$

perpendicular to the trajectory of the manoeuvring platform in slant distance. Then, consecutive overlapping areas of the corrected imaging result $$s_{IMG,i}^{GC}$$

corresponding to adjacent sections are aligned in the range dimension envelopes where the strong focus points are located, and coherent integration is performed. For the non-overlapping areas, splicing is executed, obtaining the final full-aperture imaging result $S_{all}$.

The invention also provides segmented aperture positioning method of a multi-rotor unmanned aerial vehicle-borne synthetic aperture radar. This method is used to calculate the flight trajectory of the unmanned aerial vehicle platform based on the echo signal from the synthetic aperture radar. It is characterized by the following steps:

Step S1, perform range pulse compression on the raw echo signal s(t, $\eta$) to obtain the range pulse compression signal $s_{RC}(t, \eta)$, and based on the phase history $\varphi(\eta)$ of strong scattering points in the $s_{RC}(t, \eta)$, calculate the estimated velocity $\hat{v}$ and estimated squint angle of the beam center $\hat{\theta}$;

Step S2, on the basis of the direction of the estimated velocity $\hat{v}$, segment the range pulse compression signal $s_{RC}(t, \eta)$, into N segments, with each segment corresponding to the segmented pulse compression signal $s_{RC}(t, \eta)$, where i=1 . . . N. And calculate the platform trajectory coordinates $$[X_k^i, Y_k^i, Z_k^i]$$

for the i-th segment based on the estimated velocity $\hat{\theta}$ and estimated the squint angle of beam center $\hat{\theta}$, where k=1 . . . M and M is the length of each segment in the azimuth direction. The coordinates are calculated as follow:

$$X_k^i = \int \hat{v}\eta\, d\eta,$$

$$Y_k^i = 0,$$

$$Z_k^i = \hat{R}\cos\hat{\theta}\cos\theta_{in},$$

where $\theta_{in}$ represents the angle between the beam direction of synthetic aperture radar and the normal direction of the ground plane;

Step S3, in the adjacent regions between the i-th and (i−1)-th segments, extract three strong scattering points. The coordinates of the strong scattering points in the i-th segment are denoted as $$[Q_1^i, Q_2^i, Q_3^i],$$

and the coordinates of the strong scattering points in the (i−1)-th segment are denoted as $$[Q_1^{i-1}, Q_2^{i-1}, Q_3^{i-1}];$$

Step S4, calculate the rotation matrix $\gamma$ for the i-th and (i−1)-th segments based on the coordinates of the strong scattering points $$[Q_1^{i-1}, Q_2^{i-1}, Q_3^{i-1}]$$

and $$[Q_1^i, Q_2^i, Q_3^i].$$

The rotation matrix $\gamma$ is computed as follows:

$$\gamma=[Q_1^{i-1},Q_2^{i-1},Q_3^{i-1}]\cdot[Q_1^i,Q_2^i,Q_3^i]^{-1};$$

Step S5, use the platform trajectory coordinates of the (i−1)-th segment $$[X_k^{i-1},Y_k^{i-1},Z_k^{i-1}]$$

as the reference to rotate the platform trajectory coordinates of the i-th segment. This rotation aligns the platform trajectory coordinates of adjacent segments, which are given by $$[X_k^{i-1},Y_k^{i-1},Z_k^{i-1}]=\gamma\cdot[X_k^i,Y_k^i,Z_k^i];$$

Step S6, perform coherent integration of the platform trajectory coordinates in the overlapping region of the i-th and (i−1)-th segments, and concatenate the platform trajectory coordinates in the non-overlapping region to obtain the concatenated trajectory coordinates, which are calculated by $$[P_x,P_y,P_z]=[X_k^i,Y_k^i,Z_k^i]+[X_k^{i-1},Y_k^{i-1},Z_k^{i-1}];$$

Step S7, repeat steps S3 through S6 until the spliced trajectory coordinates $[P_x, P_y, P_z]$ for all segments are obtained, so as to obtain the final trajectory coordinates $$[P_x^{all},P_y^{all},P_z^{all}]$$

of the platform.

EMBODIMENTS

In this embodiment, the manoeuvring platform refers to a multi-rotor unmanned aerial vehicle, and the onboard synthetic aperture radar operates in the Ku band as a linear frequency-modulated continuous-wave radar. The target refers to the ground area that requires synthetic aperture imaging.

As shown in FIG. 1, a segmented aperture imaging method of a multi-rotor unmanned aerial vehicle-borne synthetic aperture radar includes the following steps:

Step 1, after the unmanned aerial vehicle takes off, the unmanned aerial vehicle-borne synthetic aperture radar transmits a linear frequency-modulated signal with a carrier frequency of $f_c$, through a transmitted antenna. The transmitted signal, after being scattered by a target, is received by the radar through a receiving antenna, resulting in the raw echo signal s(t, η), where t is the fast time related to range dimension, and η is the slow time related to azimuth dimension, where t is the fast time in range dimension, and η is the slow time in azimuth dimension. Perform range pulse compression on the raw echo signal s(t, η) to obtain a range pulse compression signal $S_{RC}(t, \eta)$. On the basis of the phase history Φ(η) of strong scattering points in the range pulse compression signal $s_{RC}(t, \eta)$, the estimated velocity $\hat{\theta}$ and estimated squint angle of the beam center $\hat{\theta}$ are calculated. Specifically perform as follows in sub-steps:

Step 1-1, based on the definitions of the Doppler frequency modulation slope $K_a$ and the Doppler center $f_{ac}$, the expressions for calculating $K_a$ and $f_{dc}$ are obtained as follows:

$$K_a=\frac{d^2\varphi(\eta)}{2\pi d\eta^2}, \quad ⟨1⟩$$

$$f_{dc}=\frac{d\varphi(\eta)}{2\pi d\eta}, \quad ⟨2⟩$$

where $$\frac{d(\cdot)}{d\eta}$$

denotes the derivation of (•) with respect to the slow time in azimuth η, η is the slow time in azimuth dimension and φ(η) is the phase history of any strong scattering point in ground area;

Step 1-2, designate the space constituted by the echo signal as the signal space. For the range pulse compression signal $s_{RC}(t, \eta)$, where t is the fast time in range dimension, perform a second-order fitting on the phase history φ(η) of the strong scattering points, obtaining the expression of such strong scatterers in the signal space as follows:

$$\varphi(\eta)=\beta\eta^2+\alpha\eta+\varphi_0+o(\eta), \quad ⟨3⟩$$

where β is the coefficient of the second-order term, α is the coefficient of the first-order term, $\varphi_0$ is the constant phase term and o(η) represents the higher-order phase error;

Step 1-3, substitute the above Eq. <3> into Eqs. <1> and <2>, obtaining the expressions of $K_a$ and $f_{dc}$ in the signal space as follows:

$$K_a=\frac{\beta}{\pi}, \quad ⟨4⟩$$

$$f_{dc}=\frac{\alpha}{2\pi}; \quad ⟨5⟩$$

Step 1-4, define the space constructed by the actual positions of the target and the manoeuvring platform as the target space. On the basis of spatial geometric relationships and law of cosines, the calculation formula for the range R between the target and the platform is obtained as follows:

$$R=\sqrt{(v\eta)^2+R_0^2-2R_0v\eta\sin\theta}, \quad ⟨6⟩$$

where v represents the velocity of the manoeuvring platform, θ represents the squint angle of the beam center caused by the movement of the manoeuvring platform and $R_0$ represents the closest range between the target and the manoeuvring platform.

Perform Taylor expansion of the above Eq. <6> at $\eta=0$, and retain to the second-order term, and the expression of R is obtained:

$$R = R_0 - \frac{v^2\cos^2\theta}{2R_0}\eta^2 - v\sin\theta\,\eta. \quad \langle 7\rangle$$

On the basis of the phase calculation formula and definition, the expression for the phase history $\varphi(\eta)$ in the target space is obtained as follows:

$$\varphi(\eta) = \frac{4\pi}{\lambda}\left[\frac{v^2\cos^2\theta}{2R_0}\eta^2 - v\sin\theta\,\eta + R_0\right], \quad \langle 8\rangle$$

where $\lambda$ represents the wavelength of the system transmitted signal; Step 1-5, substitute the above Eq. <8> into Eqs. <1> and <2>, respectively, obtaining the expressions of $K_a$ and $f_{dc}$ in the target space as follow:

$$K_a = -\frac{2v^2\cos^2\theta}{\lambda R}, \quad \langle 9\rangle$$

$$f_{dc} = -\frac{2v\sin\theta}{\lambda}; \quad \langle 10\rangle$$

Step 1-6, by comparing the right side of the above Eqs. <4> and <9>, and comparing the right side of the above Eqs. <5> and <10>, the estimated velocity, estimated squint angle of the beam center, and estimated range are obtained as follow:

$$\hat{v} = \sqrt{\left(\frac{\lambda\alpha}{4\pi}\right)^2 + \frac{-\lambda\beta\hat{R}}{2\pi}}, \quad \langle 11\rangle$$

$$\hat{\theta} = \tan^{-1}\left(\frac{\lambda\alpha}{4\pi}\Big/\sqrt{\frac{-\lambda\beta\hat{R}}{2\pi}}\right), \quad \langle 12\rangle$$

$$\hat{R} = R_0 + \frac{\varphi_0\lambda}{4\pi} - \frac{\lambda\alpha}{8\pi}. \quad \langle 13\rangle$$

Step 2, on the basis of the direction of the estimated velocity $\hat{v}$, segment the range pulse compression signal $s_{RC}(t, \eta)$ into N segments, with each segment corresponding to the segmented pulse compression signal $s_{RC,i}(t, \eta)$, where i=1 . . . N. Specifically perform as follows:

On the basis of the positive or negative direction of the estimated velocity $\hat{v}$, the range pulse compression signal $s_{RC}(t, \eta)$ is preliminarily divided into segments consistent with the velocity direction. Next, check whether the length of each segment is less than a synthetic aperture length, which is given by $L_s=R\times\theta_{BW}$. If it is less, extend the segment to both sides to be one synthetic aperture length; otherwise, do not process it. Finally, the range pulse compression signal $s_{RC}(t, \eta)$ is divided into N segments, and the echo signal corresponding to each segment is represented as $s_{RC,i}(t, \eta)$ where i=1 . . . N.

Step 3, on the basis of the estimated velocity $\hat{v}$ and the estimated squint angle of the beam center $\hat{\theta}$, the phase compensation $\Phi_{m,i}$ for the segmented pulse compression signal $s_{RC,i}(t, \eta)$ is calculated. Multiply the segmented pulse compression signal $s_{RC,i}(t, \eta)$ of each segment by the motion error compensation filter $H_{MC,i}=\exp(-j\varphi_{m,i})$, where $j=\sqrt{-1}$, obtaining N compensated echo signal of each segment $s_{RC}(t, \eta)$. This realizes the motion compensation of the segmented pulse compression signal $s_{RC,i}(t, \eta)$. Specifically perform as follows:

Step 3-1, the influence of the slant range change $\delta R$, caused by the change in the platform motion state, on the phase, are calculated as follows:

$$\delta R = -\frac{4\pi}{\lambda}(\hat{v} - v_0)\sin\theta_0\,\eta, \quad \langle 14\rangle$$

where $v_0$ is the mean value of the estimated velocity $\theta$ and $\theta_0$, is the mean value of the estimated squint angle of the beam center $\hat{\theta}$;

Step 3-2, the expression for the phase compensation amount corresponding to the segmented pulse compression signal $s_{RC,i}(t, \eta)$ of each segment are derived as follow:

$$\varphi_{m,i} = -\frac{4\pi}{\lambda}(\hat{R} - R_0 + (\hat{v} - v_0)\sin\theta_0\,\eta); \quad \langle 15\rangle$$

Step 3-3, the expression for the motion error compensation filter are derived as follow:

$$H_{1,i} = \exp(-j\varphi_{m,i}), \quad \langle 16\rangle$$

where j represents imaginary number, given by $j=\sqrt{-1}$;

Step 3-4, multiply the segmented pulse compression signal $s_{RC,i}(t, \eta)$ of each segment by the motion error compensation filter as described in Eq. <14>, obtaining the compensated echo signal $s_{MC,i}(t, \eta)$ of each segment.

Step 4, perform a two-dimensional Fourier transform on the compensated echo signal $s_{MC,i}(t, \eta)$ to obtain the two-dimensional spectrum of $s_{MC,i}(f, f_d)$. Utilize the series inversion method to decompose the two-dimensional spectrum $s_{MC,i}(f, f_d)$, constructing azimuth compression filter $H_{AC,i}$, where f represents the frequency corresponding to the fast time t in range dimension and $f_d$ represents the Doppler frequency corresponding to the slow time $\eta$ in azimuth dimension. Specifically perform as follows:

Step 4-1, perform a two-dimensional Fourier transform on the compensated echo signal $s_{MC,i}(f, f_d)$ to obtain the two-dimensional spectrum $s_{MC,i}(f, f_d)$, where f represents the frequency corresponding to the fast time t in range dimension and $f_d$ represents the Doppler frequency corresponding to the slow time $\eta$ in azimuth dimension;

Step 4-2-1, on the basis of the stationary phase method, the expression of the two-dimensional spectrum $s_{MC,i}(f, f_d)$ corresponding to the segment is obtained as:

$$s_{MC,i}(f, f_d) = \exp\left[-j\left(-\frac{4\pi R}{c}(f + f_c) + \frac{\pi c R}{2v^2\cos^2\theta}\cdot\frac{1}{f + f_c}f_d^2\right)\right], \quad \langle 17\rangle$$

where $f_c$ represents the carrier frequency of the system transmitted signal and c represents the speed of light;

Step 4-2-2, using the series inversion method, decompose the above Eq. <17> to obtain the two-dimensional spectrum expression of each segment that eliminates the coupling terms between f and $f_d$:

$$s_{MC,i}(f,f_d)=\exp\left[-j\left(-\frac{4\pi R}{c}(f+f_c)+\frac{\pi cR}{2v^2\cos^2\theta}\cdot\frac{1}{f+f_c}f_d^2\right)\right]$$
$$=\exp\left[-j\left(-\frac{4\pi R}{c}(f+f_c)+\frac{\pi cR}{2v^2\cos^2\theta}\cdot\left(\frac{1}{f_c}\cdot\frac{1}{f/f_c+1}\right)f_d^2\right)\right]$$
$$\approx\exp\left[-j\left(-\frac{4\pi R}{c}(f+f_c)+\frac{\pi cR}{2v^2\cos^2\theta}\cdot\frac{1}{f_c}\left(1-\frac{f}{f_c}\right)f_d^2\right)\right]$$
$$=\exp\left[-j\left(-\frac{4\pi R}{c}(f+f_c)+\frac{\pi cR}{2v^2\cos^2\theta}\cdot\frac{f_d^2}{f_c^2}+\frac{\pi cR}{2v^2\cos^2\theta}\cdot\frac{f}{f_c^2}f_d^2\right)\right]; \quad \langle 18\rangle$$

Step 4-2-3, on the basis of the above Eq. <18>, derive the expression of each segment for the ideal phase filter:

$$H_{2,i}=\exp\left[-j\left(\frac{\pi cR}{2v^2\cos^2\theta}\cdot\frac{f_d^2}{f_c^2}+\frac{\pi cR}{2v^2\cos^2\theta}\cdot\frac{f}{f_c^2}f_d^2\right)\right]; \quad \langle 19\rangle$$

Step 4-2-4, substitute the estimated velocity $\hat{v}$, estimated squint angle of the beam center $\hat{\theta}$ and estimated reference range $\hat{R}$ into the above Eq. expression <19> to obtained the azimuth compression filter expression of each segment:

$$H_{2,i}=\exp\left[-j\left(\frac{\pi c\hat{R}}{2\hat{v}^2\cos^2\hat{\theta}}\cdot\frac{f_d^2}{f_c^2}+\frac{\pi c\hat{R}}{2\hat{v}^2\cos^2\hat{\theta}}\cdot\frac{f}{f_c^2}f_d^2\right)\right]. \quad \langle 20\rangle$$

Step 5, multiply the two-dimensional spectrum $s_{MC,i}(f, f_d)$ by the azimuth compression filter of each segment $H_{AC,i}$, and then perform a two-dimensional inverse Fourier transform to obtain N imaging results, represented as $s_{IMG,i}(t, \eta)$ of each segment.

Figure 3:
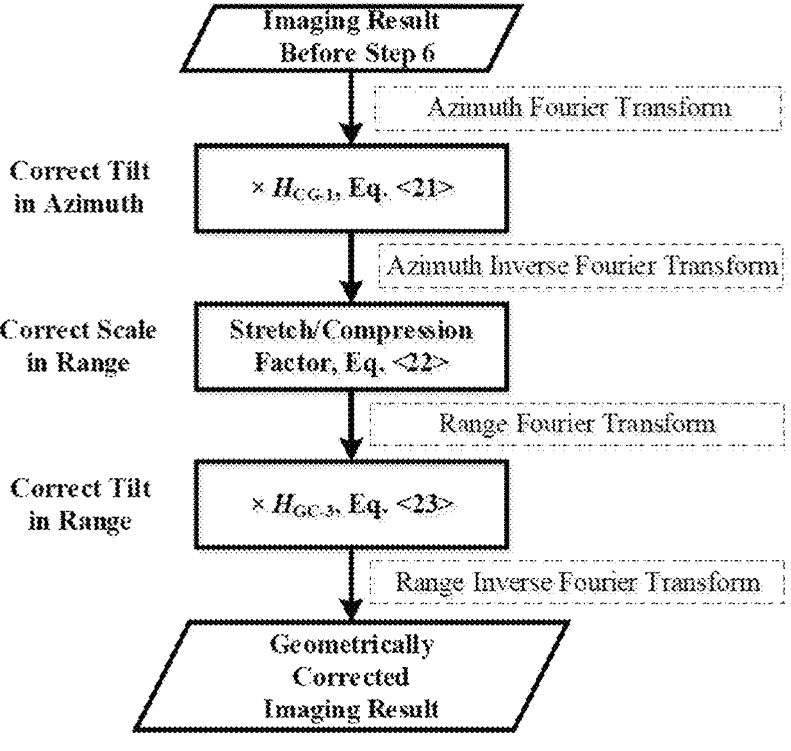
FIG. 3. Flowchart of geometric correction in an embodiment of the present invention.
Figure 4:
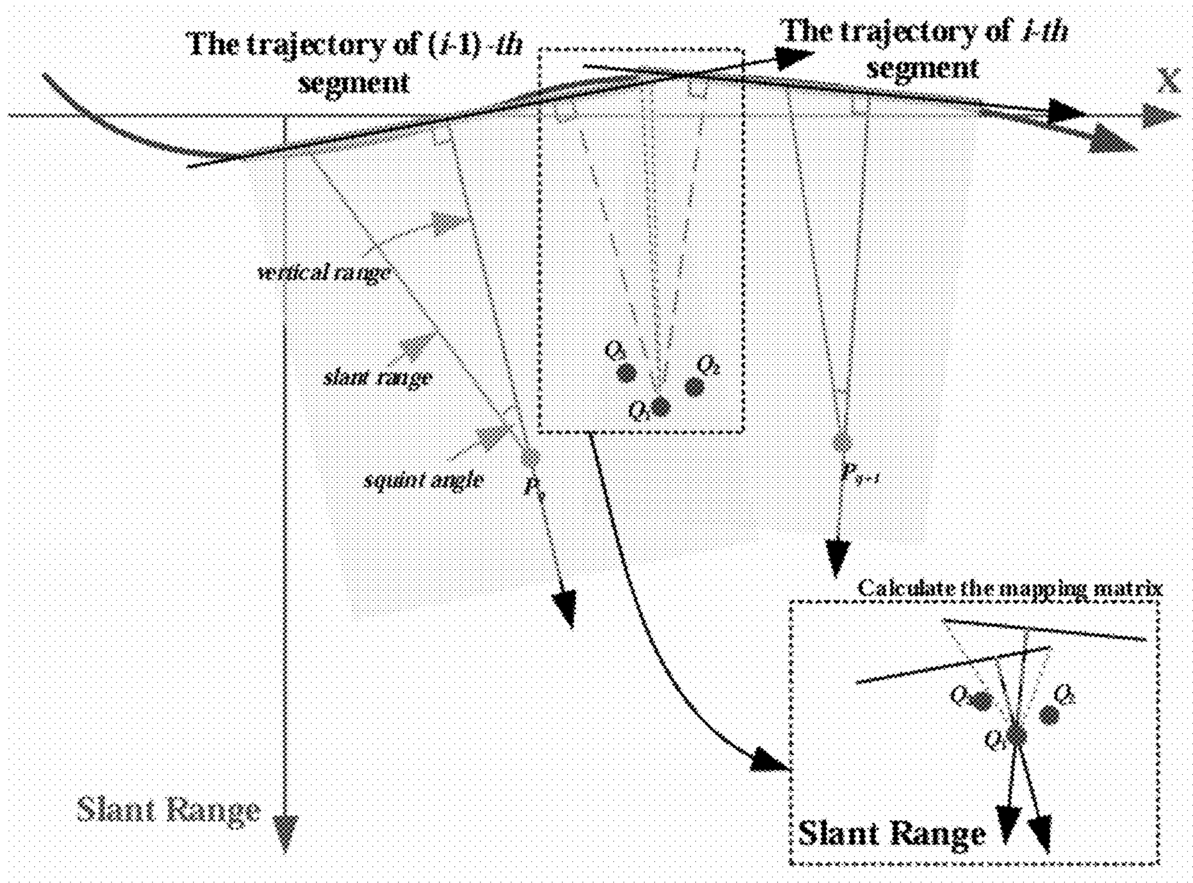
FIG. 4. Schematic diagram illustrating trajectory estimation in an embodiment of the present invention.

Step 6, refer to FIG. 3, sequentially, for the overlapping areas in the imaging result $s_{IMG,i}(t, \eta)$ corresponding to adjacent segments, align and coherently accumulate the envelopes in the range dimension where the strong focusing points are located. For the non-overlapping areas, perform splicing to obtain the final full-aperture imaging result, denoted as $S_{all}$. Specifically perform as follows in sub-steps:

Step 6-1, perform the Fourier transformation in the azimuth dimension on the imaging result $s_{IMG,i}(t, \eta)$. This process will yield a result of each segment in the range-Doppler domain, represented as $s_{IMG,i}(t, f_d)$;

Step 6-2, on the basis of the characteristics of Fourier transformation and the geometric structure of the target space, construct the expression for a tilt correction filter to correct the tilt of the image:

$$H_{GC-1}=\exp\left(j2\pi f_d\frac{l\tan\theta_0}{v_0}\right), \quad \langle 21\rangle$$

where l represents the range scale of a typical building.

Step 6-3, multiply the range-Doppler domain image $s_{IMG,i}(t, f_d)$ by the tilt correction filter $H_{GC-1}$, obtaining the tilt-corrected frequency domain image $$s_{IMG,i}^{GC-1}(t, f_d);$$

Step 6-4, perform the inverse Fourier transform in the azimuth dimension on the tilt-corrected frequency domain image $$s_{IMG,i}^{GC-1}(t, f_d),$$

obtaining the tilt-corrected time domain image $$s_{IMG,i}^{GC-1}(t, \eta);$$

Step 6-5, on the basis of the geometric structure of the target space, obtain the expression for the stretch/compression factor:

$$t=\frac{l\sin\theta_0}{\sqrt{\hat{R}^2+H^2}-R_0}\frac{1}{\tan\theta_0}t; \quad \langle 22\rangle$$

Step 6-6, substitute the aforementioned Eq. <22>, into the tilt-corrected time domain image $$s_{IMG,i}^{GC-1}(t, \eta),$$

obtaining the deformation-corrected time domain image $$s_{IMG,i}^{GC-2}(t, \eta);$$

Step 6-7, perform the Fourier transform in range dimension on the deformation-corrected time domain image $$s_{IMG,i}^{GC-2}(t, \eta),$$

obtaining the deformation-corrected frequency domain image $$s_{IMG,i}^{GC-2}(f, \eta);$$

Step 6-8, on the basis of the characteristics of the Fourier transform and the geometric structure of the target space, construct the expression for a secondary position correction filter to correct image translation:

$$H_{GC-3} = \exp\left(j2\pi f \frac{2(\hat{R}/\cos\theta_0 - \hat{R})}{c}\right); \quad \langle 23 \rangle$$

Step 6-9, multiply the deformation-corrected frequency domain image $$s_{IMG,i}^{GC-2}(f, \eta)$$

by the position correction filter $H_{Gc-3}$, as described in Eq. <23>, to obtain the geometrically corrected frequency domain image $$s_{IMG,i}^{GC-3}(f, \eta);$$

Step 6-10, perform the inverse Fourier transform in the range dimension on the geometrically corrected frequency domain image $$s_{IMG,i}^{GC-3}(f, \eta),$$

to obtain the geometrically corrected imaging result of each segment, denoted as $$s_{IMG,i}^{GC}(f, \eta);$$

Step 6-11, rotating the geometrically corrected time-domain image $$s_{IMG,i}^{GC}(t, \eta)$$

counterclockwise by $\hat{\theta}-\theta_0$ degrees to obtain the time-domain image to be spliced $$s_{IMG,i}^{GC-p}(t, \eta),$$

which is perpendicular to the trajectory of the manoeuvring platform;

Step 6-12, sequentially align the envelopes in the range dimension where the strong focus points are located in the overlap regions of the adjacent to-be-spliced time-domain images $$s_{IMG,i}^{GC-p}(t, \eta);$$

Step 6-13, perform coherent integration in the overlapping regions and sequentially connect the non-overlapping regions, completing segments splicing and obtaining the full-aperture imaging result $S_{all}$.

The position part of the segmented aperture imaging and positioning method of a multi-rotor unmanned aerial vehicle-borne synthetic aperture radar includes the following steps:

Step S1, perform range pulse compression on the raw echo signal $s(t, \eta)$ to obtain the range pulse compression signal $s_{RC}(t, \eta)$, and based on the phase history $\varphi(\eta)$ of strong scattering points in the $s_{RC}(t, \eta)$, calculate the estimated velocity $\hat{v}$ and estimated squint angle of the beam center $\hat{\theta}$;

This step is identical to Step 1 in the part concerning the imaging method, and thus, it is not reiterated here.

Step S2, on the basis of the direction of the estimated velocity $\hat{v}$, segment the range pulse compression signal $s_{RC}(t, \eta)$ into N segments, with each segment corresponding to the echo signal $s_{RC,i}(t, \eta)$, where i=1 . . . N. Additionally, calculate the platform trajectory coordinates $$[X_k^i, Y_k^i, Z_k^i]$$

for the i-th segment based on the estimated velocity $\hat{v}$ and estimated the squint angle of beam center $\hat{\theta}$, where k=1 . . . M and M is the length of each segment in the azimuth direction. The coordinates are calculated as follow:

$$X_k^i = \int \hat{v}\eta d\eta, \quad \langle 24 \rangle$$

$$Y_k^i = 0, \quad \langle 25 \rangle$$

$$Z_k^i = \hat{R}\cos\hat{\theta}\cos\theta_{in}, \quad \langle 26 \rangle$$

where $\theta_{in}$ represents the angle between the beam direction of synthetic aperture radar and the normal direction of the ground plane;

Step S3, in the adjacent regions between the i-th and (i−1)-th segments, extract three strong scattering points. The coordinates of the strong scattering points in the i-th segment are denoted as $$[Q_1^i, Q_2^i, Q_3^i],$$

and the coordinates of the strong scattering points in the (i−1)-th segment are denoted as $$[Q_1^{i-1}, Q_2^{i-1}, Q_3^{i-1}];$$

Step S4, calculate the rotation matrix γ for the i-th and (i−1)-th segments based on the coordinates of the strong scattering points $$[Q_I^{i-1}, Q_2^{i-1}, Q_3^{i-1}]$$

and $$[Q_1^i, Q_2^i, Q_3^i].$$

The rotation matrix γ is computed as follows:

$$\gamma = [Q_1^{i-1}, Q_2^{i-1}, Q_3^{i-1}] \cdot [Q_1^i, Q_2^i, Q_3^i]^{-1}; \quad \langle 27 \rangle$$

Step S5, use the platform trajectory coordinates of the (i−1)-th segment $$[X_k^{i-1}, Y_k^{i-1}, Z_k^{i-1}]$$

as the reference to rotate the platform trajectory coordinates of the i-th segment. This rotation aligns the platform trajectory coordinates of adjacent segments, which are as follows:

$$[X_k^{i-1}, Y_k^{i-1}, Z_k^{i-1}] = \gamma \cdot [X_k^i, Y_k^i, Z_k^i]; \quad \langle 28 \rangle$$

Step S6, perform coherent integration of the platform trajectory coordinates in the overlapping region of the i-th and (i−1)-th segments, and concatenate the platform trajectory coordinates in the non-overlapping region to obtain the concatenated trajectory coordinates $$[P_x^i, P_y^i, P_z^i],$$

which are as follows:

$$[P_x, P_y, P_z] = [X_k^i, Y_k^i, Z_k^i] + [X_k^{i-1}, Y_k^{i-1}, Z_k^{i-1}]; \quad \langle 29 \rangle$$

Step S7, repeat steps S3 through S6 until the spliced trajectory coordinates $[P_x, P_y, P_z]$ for all segments are obtained, so as to obtain the final trajectory coordinates $$[P_x^{all}, P_y^{all}, P_z^{all}]$$

of the platform.

The advantages of this method are further illustrated below in conjunction with specific comparative verification results.

1. Simulation Conditions:

As listed in Table 1:

TABLE 1

The parameters of simulation

| Symbol | Name | Value |
|---|---|---|
| $f_c$ | Carrier frequency of the transmitted signal | 15.2 GHz |
| B | Bandwidth of the transmitted signal | 2.5 GHz |
| H | Flight height of the platform | 300 m |
| PRF | Pulse Repetition Frequency | 2000 Hz |
| $\theta_a$ | Beam width in azimuth | 6° |
| $\theta_r$ | Beam width in range | 10° |
| $\theta_{in}$ | Angle of incidence | 65° |
| v | Velocity of the platform | 40 m/s |
| $F_s$ | Sampling frequency | 25 MHz |
| $\rho_a$ | Resolution in azimuth | 9.42 cm |
| $\rho_r$ | Resolution in range | 6 cm |
| S | Width of the swath | 691.17 m |
| $L_{sar}$ | Synthetic aperture length | 123.89 m |
| $R_0$ | Reference range | 709.86 m |

2. Simulation and Experimentation

Figure 5A:
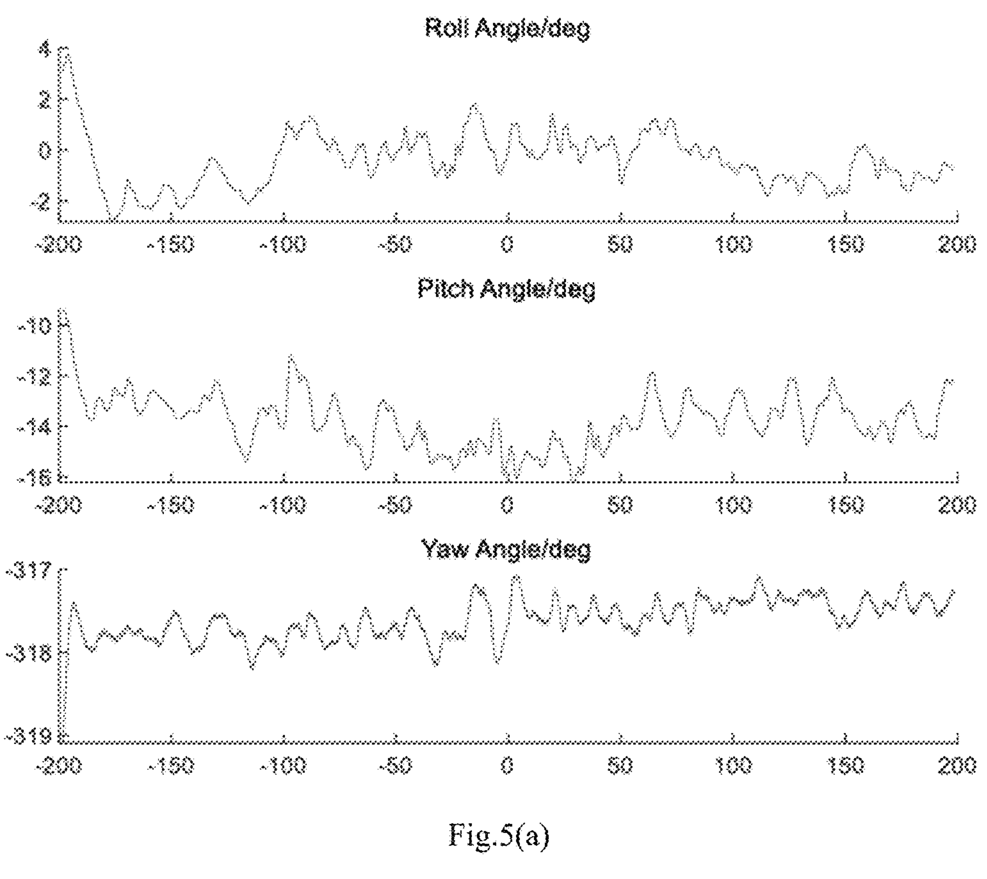
FIGS. 5(*a*)-(*b*). Curves depicting measured trajectory and changes in attitude angles in an embodiment of the present invention.
Figure 5B:
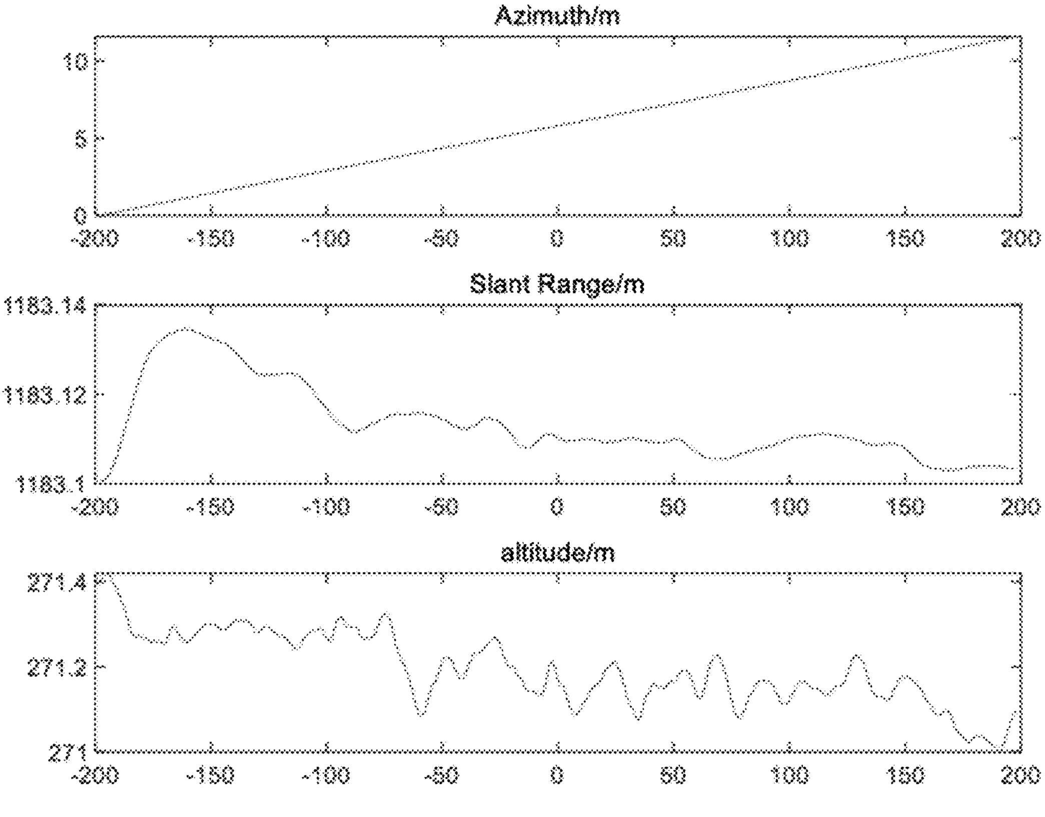

Case 1: Under the conditions listed in Table 1, the grid-points target range pulse compression signal $s_r(t, \eta)$ obtained from the simulated and measured trajectory. The measured trajectory comes from the actual data measured by the inertial guidance in an experiment, and its trajectory is shown in FIGS. 5(*a*) and 5(*b*). In which, FIG. 5(*a*) shows the change curve of the attitude angle of the manoeuvring platform during flight recorded by the inertial guidance with respect to the random movement of the platform. The three figures from top to bottom respectively represent the change curves of roll angle, pitch angle, and yaw angle relative to the platform movement. The horizontal axis in the figure represents the path flown by the manoeuvring platform from −200 m to 200 m. FIG. 5. (*b*) shows the curve of the motion trajectory of the manoeuvring platform in three dimensions recorded by the inertial guidance. The three images from top to bottom respectively represent the change curves of azimuth dimension, distance dimension, and height dimension.

Figure 6:
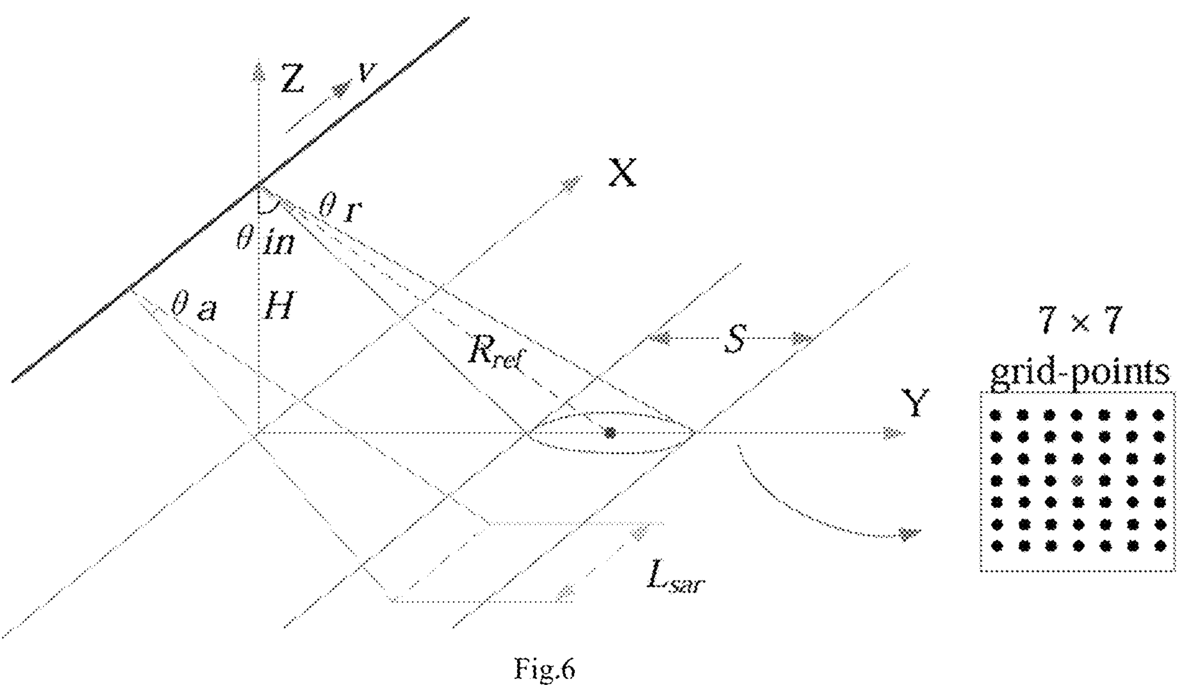
FIG. 6. Schematic diagram illustrating the relationship between platform trajectory and grid-based target space in an embodiment of the present invention.
Figure 7A:
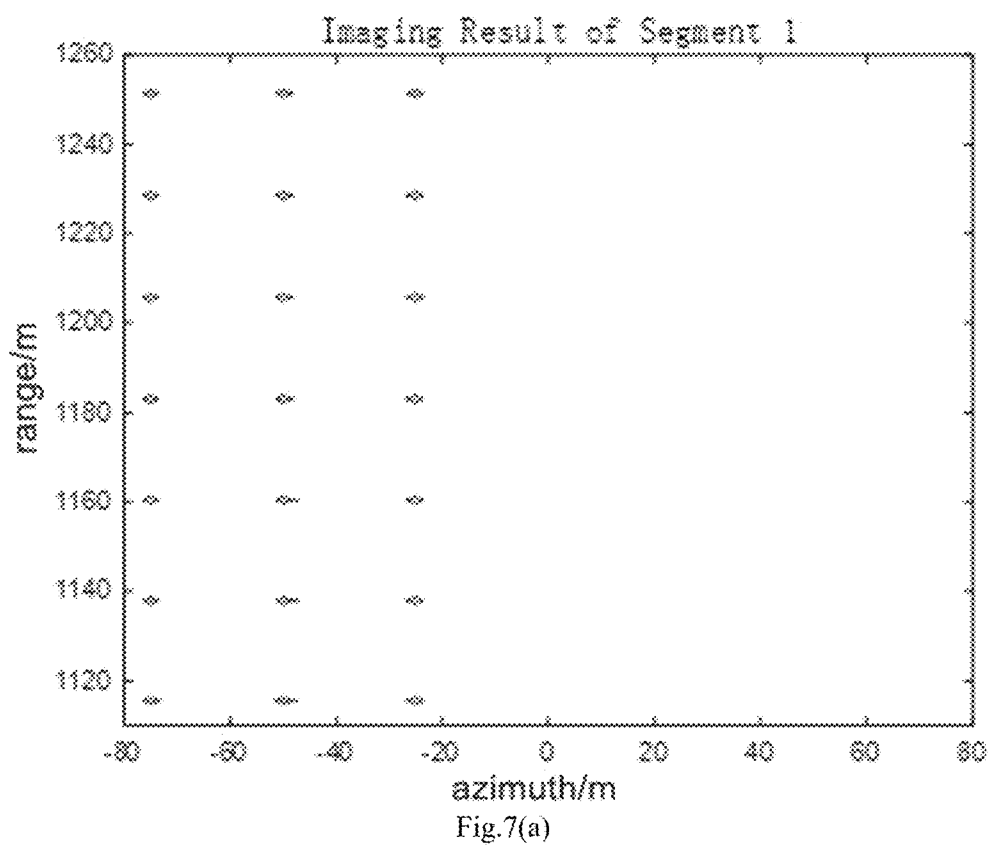
FIGS. 7(*a*)-(*e*). Comparative image results, comprising individual segment images, full-aperture image, and results obtained using traditional imaging methods in an embodiment of the present invention.
Figure 7B:
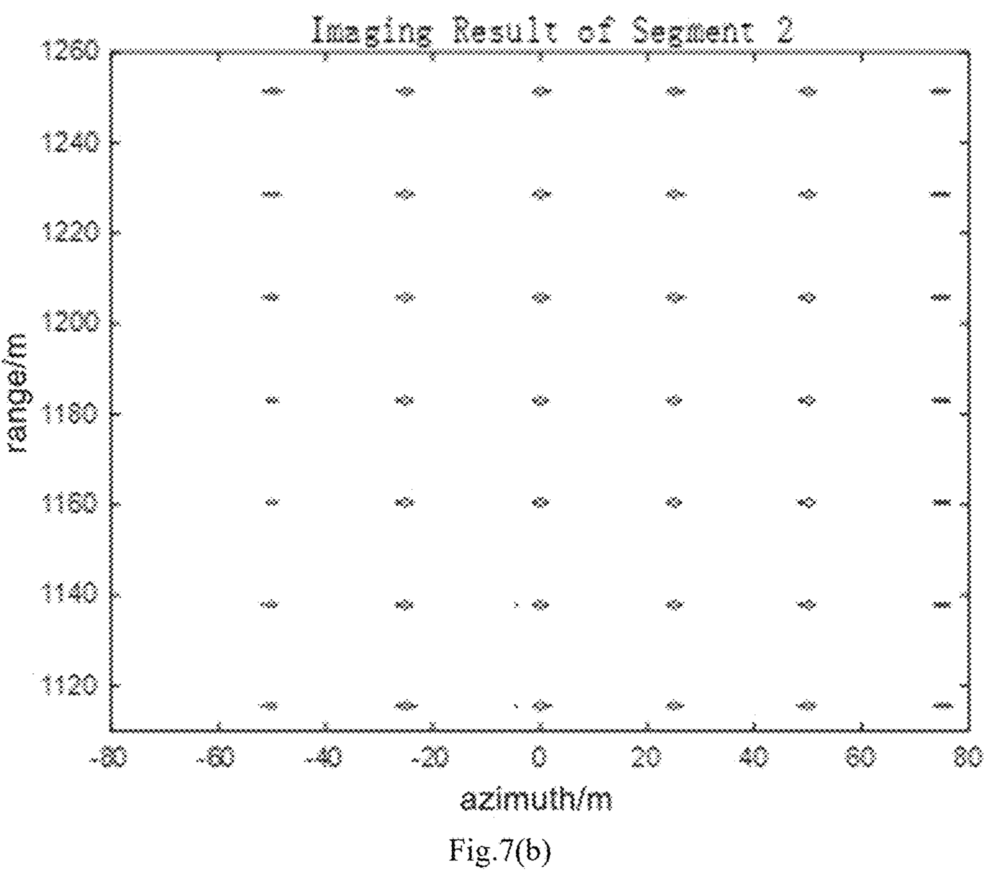
Figure 7C:
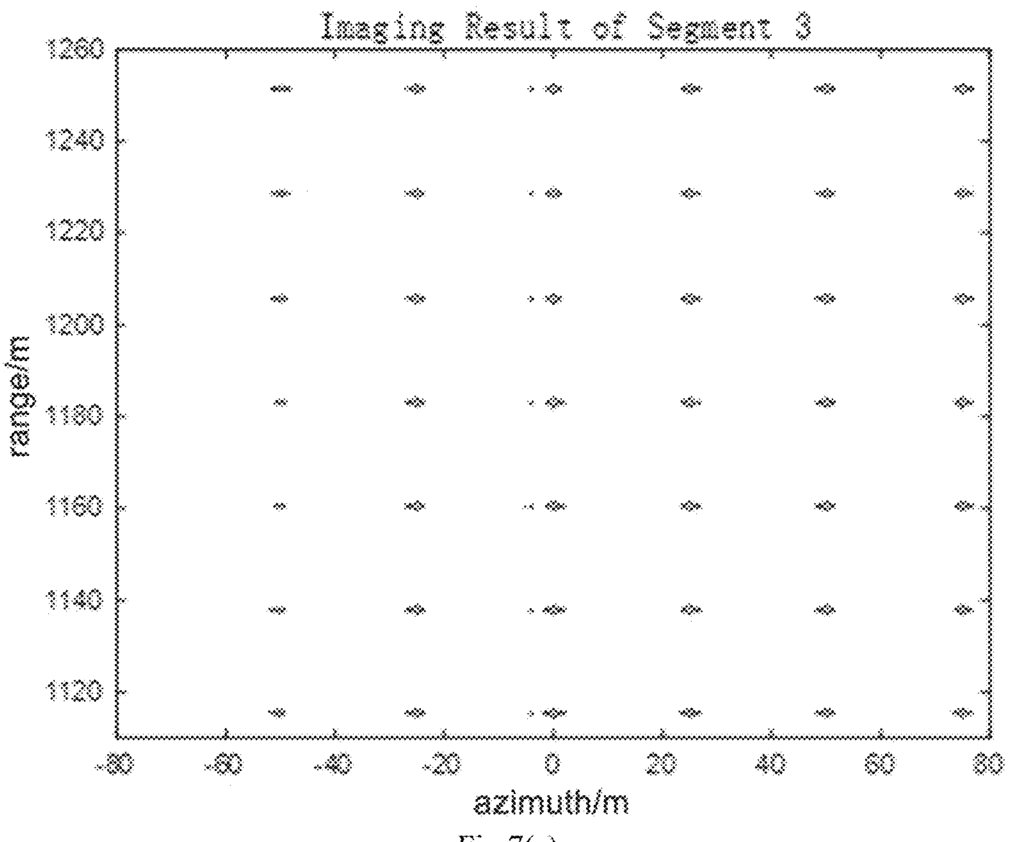
Figure 7D:
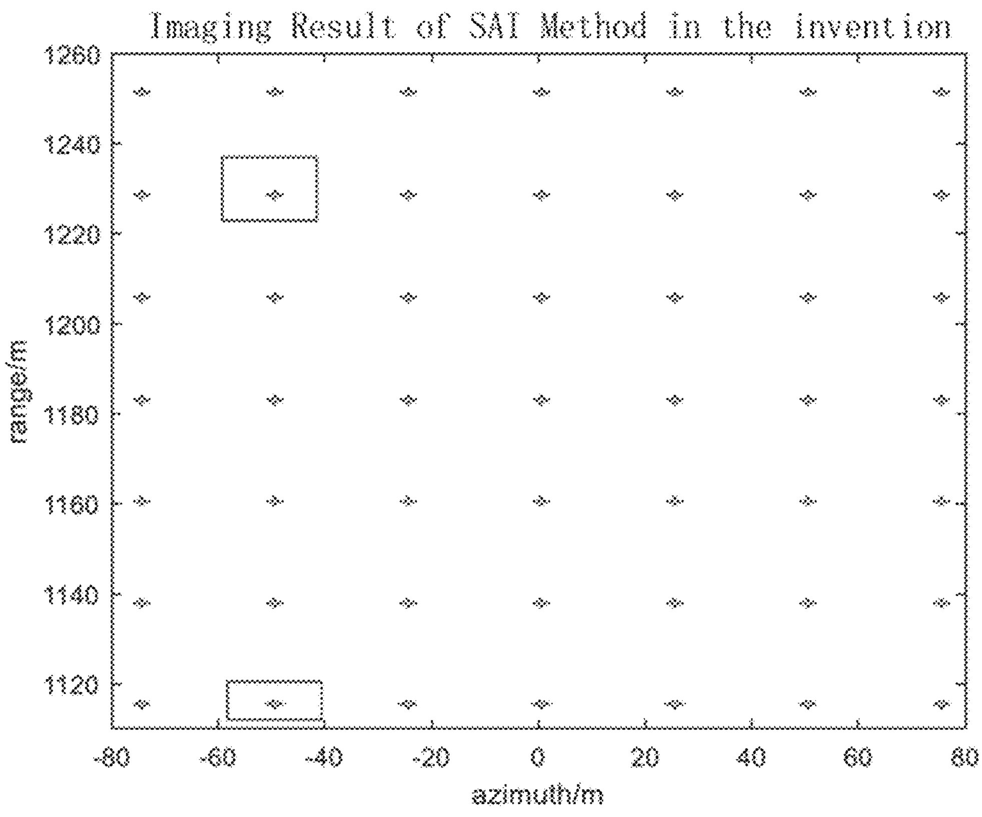
Figure 7E:
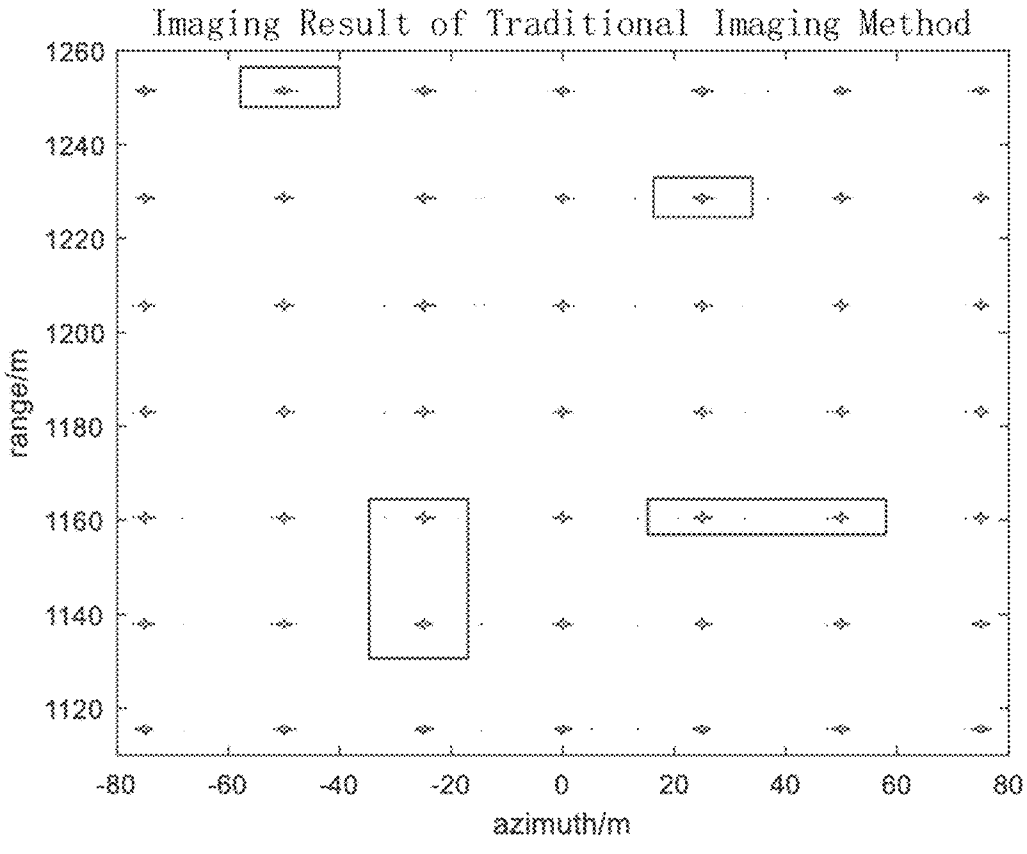
Figure 8A:
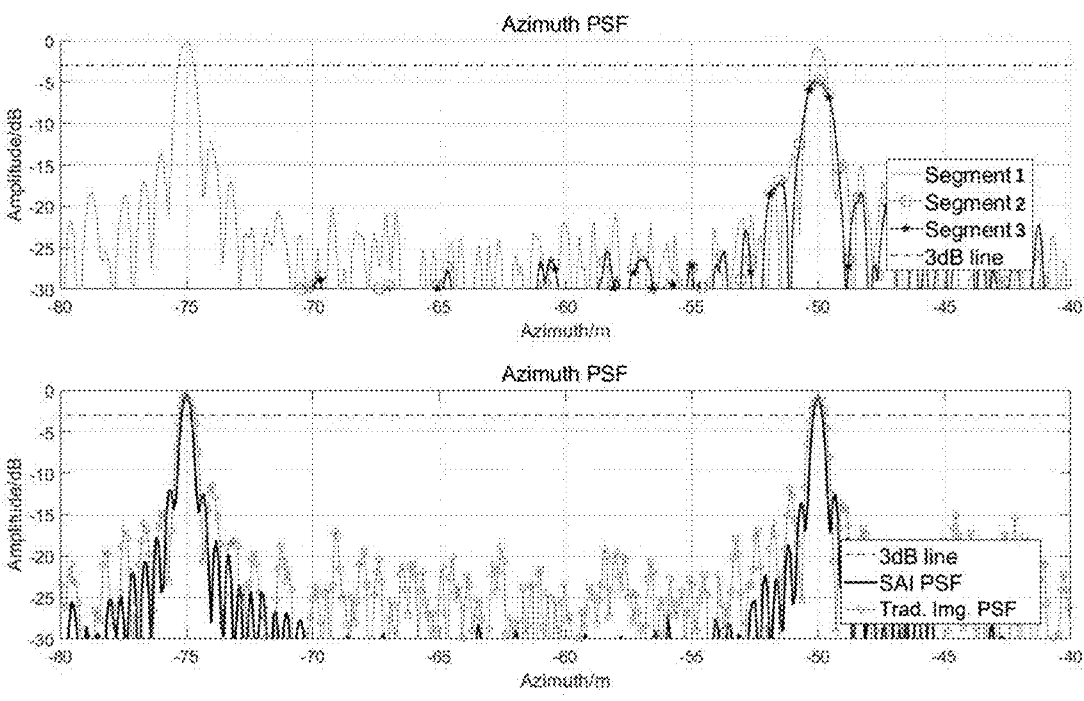
FIGS. 8(*a*)-(*d*). Comparative results of point spread functions between the present invention and traditional imaging methods in an embodiment of the present invention.
Figure 8B:
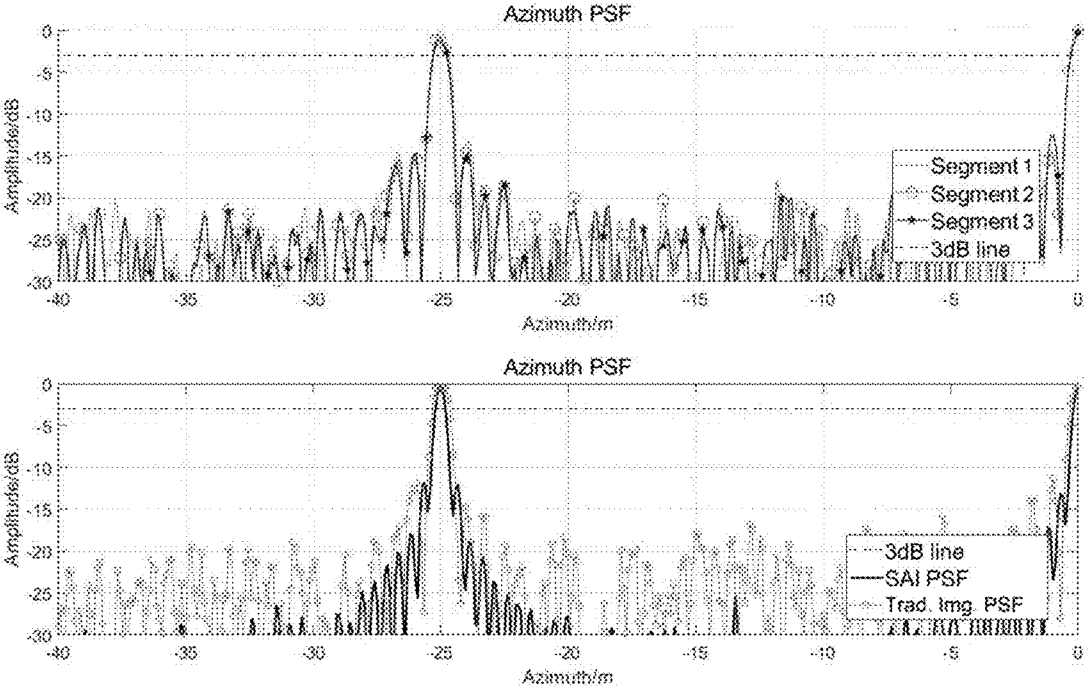
Figure 8C:
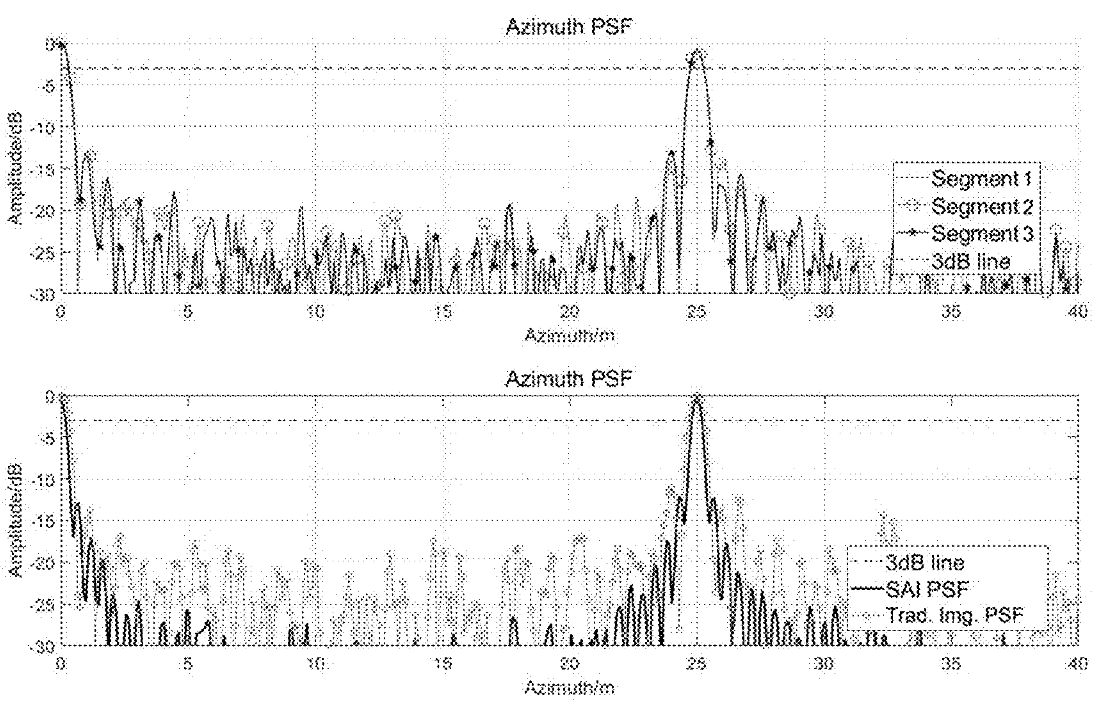
Figure 8D:
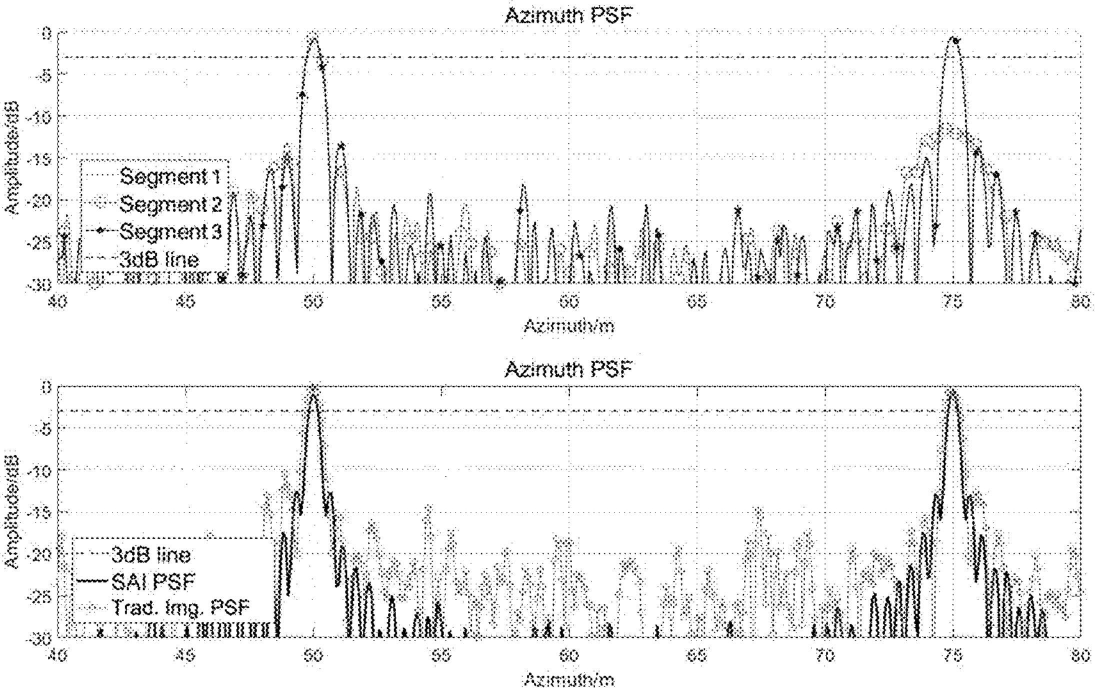

The grid-points target consists of 7×7 points with a distance and azimuth interval of 25 m each. The spatial relationship between the grid-points target and the platform trajectory is shown in FIG. 6. In FIG. 6, the coordinates X, Y, and Z correspond to azimuth, range, and height dimensions, respectively. In the figure, $R_{ref}$ represents the reference range of the system at the current incident angle $\theta_{in}$, H represents the average flight height of the manoeuvring platform, $\theta_a$ represents the beam width of the system in the azimuth dimension, $\theta_{bw}$ represents the beam width of the system in the distance dimension, S represents the width of the area to be measured, ν represents the motion speed of the manoeuvring platform and $L_s$ represents the length of a synthetic aperture. On the right side of the figure, the grid represents the positional relationship of the simulation targets, with the center of the grid located at the intersection of $R_{ref}$ on the left side of the picture and the Y-axis. The length and width of the grid are each evenly arranged with 7 points, with a point spacing of 25 m. The values of the other parameters refer to Table 1.

After range pulse compression on $s_r(t, \eta)$, $s_{RD}(t, \eta)$ is obtained. The segmented aperture imaging (SAI) algorithm and traditional imaging methods are respectively used for imaging comparison on $s_{RD}(t, \eta)$ and the results are shown in FIGS. 7(*a*)-7(*e*) and 8. In these, the trajectory is divided into three segments (Segment 1, Segment 2, Segment 3) by the SAI algorithm proposed in this invention. In FIGS. 7(*a*), 7(*b*), and 7(*c*) respectively represent the imaging results after geometric correction in Segment 1, Segment 2, and Segment 3 of this embodiment. Since each segment can only image part of the area, the imaging results of each segment only contain part of the target area. Additionally, at the edge of the azimuth dimension, the outline of the point targets can be seen to be diffuse. FIG. 7(*d*) is the full-aperture imaging result after splicing each segment in this embodiment, and FIG. 7(*e*) is the imaging result of the traditional imaging method. Comparing FIGS. 7(*d*) and 7(*e*), it can be seen that the focus point outlines have different clarities, and there are differences in brightness, among which the points framed by the square are the most obvious in comparison. FIG. 8 shows the comparison results of the point spread function between this embodiment and the traditional imaging methods. In FIG. 8, the upper image is a comparative diagram of the point spread function curves of the third-row point targets in Segments 1, 2, and 3, and the lower image is a comparative diagram of the point spread function curves of the third-row (in azimuth dimension) point targets between the SAI method proposed in this paper and the traditional imaging methods. By analyzing the main lobe widening at the −3 dB position of each peak in the point spread function curves of Segments 1, 2, 3, the SAI method, and the traditional imaging methods, the magnitude of resolution expansion relative to the theoretical value can be obtained. On the basis the peak amplitude loss of each segment is larger at the edges, the final full-aperture image of SAI greatly reduces its peak amplitude loss due to the complementary relationship between each segment. After measuring the point spread function curve indices of a row of points in the imaging results, the amount of information contained in the complete image is judged by the image entropy. The higher the image focusing effect, the more information is concentrated, and the smaller the image entropy. The final full-aperture image of the SAI method has the smallest entropy. Comparing the main lobe widening system, main-to-sidelobe ratio, peak amplitude loss, and image entropy, the SAI method proposed in this invention has higher resolution and a greater signal-to-noise ratio compared to traditional imaging methods. Additionally, its peak amplitude loss is comparable to the original methods, and it contains more information. Therefore, the SAI method proposed in this invention has excellent imaging effects and solves the practical problems encountered by synthetic aperture radar carried by unmanned aerial vehicles.

TABLE 2

Comparison of Image Quality Metrics

| The column of the target | Image result of segment 1 | Image result of segment 2 | Image result of segment 3 | Image result of full--aperture | Image result of traditional imaging method |
|---|---|---|---|---|---|
| A) Comparison of Main Lobe Widening Coefficients | | | | | |
| 1 | 1.01 | — | — | 1.01 | 1.75 |
| 2 | 1.12 | — | — | 1.12 | 1.79 |
| 3 | 2.65 | 1.07 | 1.13 | 1.00 | 1.75 |
| 4 | — | 1.93 | 1.71 | 1.04 | 1.72 |
| 5 | — | 1.63 | 1.62 | 1.25 | 1.78 |
| 6 | — | 1.65 | 1.52 | 1.06 | 1.73 |
| 7 | — | ∞ | 1.67 | 1.08 | 1.75 |
| B) Main-to-sidelobe ratio (dB) | | | | | |
| 1 | 12.40 | — | — | 12.56 | 11.11 |
| 2 | 13.41 | — | — | 12.05 | 10.52 |
| 3 | 13.12 | 12.82 | 12.54 | 11.98 | 11.12 |
| 4 | — | 12.56 | 13.20 | 12.26 | 11.12 |
| 5 | — | 13.10 | 13.08 | 13.25 | 11.16 |
| 6 | — | 12.05 | 13.11 | 12.26 | 10.47 |
| 7 | — | 2.20 | 13.35 | 12.21 | 12.45 |
| C) Peak amplitude loss (dB) | | | | | |
| 1 | 0.00 | — | — | 0.41 | 0.81 |
| 2 | 0.87 | — | — | 0.87 | 1.04 |
| 3 | 0.21 | 0.91 | 1.27 | 0.42 | 0.32 |
| 4 | — | 0.00 | 0.00 | 0.61 | 0.24 |
| 5 | — | 0.64 | 1.02 | 0.31 | 0.01 |
| 6 | — | 0.72 | 0.76 | 1.06 | 0.21 |
| 7 | — | 11.97 | 0.61 | 0.50 | 0.63 |

D) Image entrogy

Figure 9A:
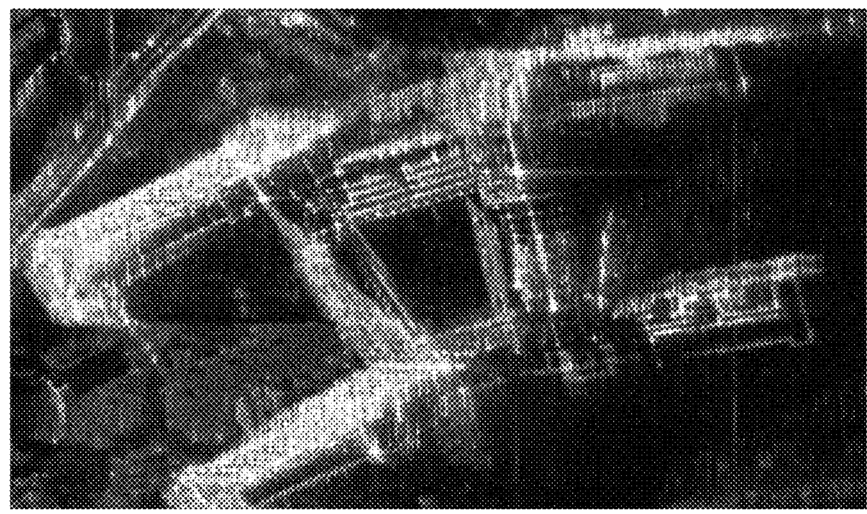
FIGS. 9(*a*)-(*c*). Comparative image results between traditional imaging methods, the present invention, and optical models in an embodiment of the present invention.
Figure 9B:
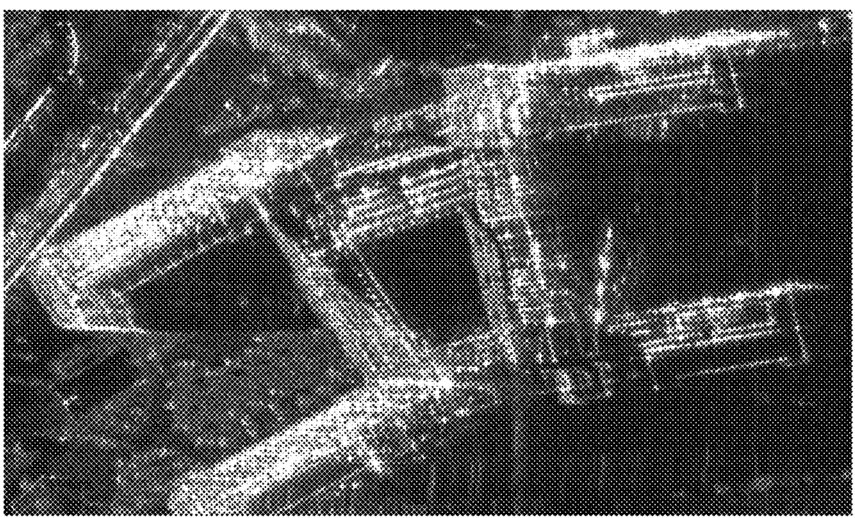
Figure 9C:
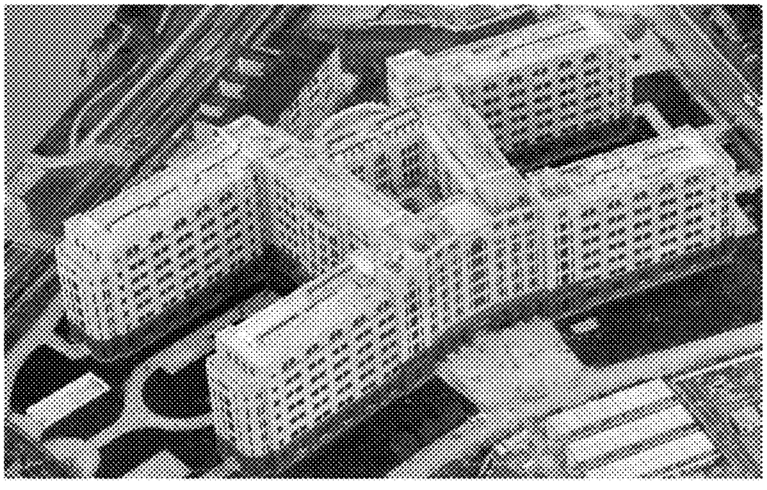

| The column of the target | Image result of segment 1 | Image result of segment 2 | Image result of segment 3 | Image result of full-aperture |
|---|---|---|---|---|
| 6.98 | 7.00 | 6.96 | 6.92 | 6.95 |

of the statistical results in the figure, as shown in Table 2 A), the smaller the main lobe widening coefficient, the better the image focusing effect. By comparing the magnitude of the main lobe and sidelobes of each peak in these five curves, the statistical results are shown in Table 2 B). A larger main-to-sidelobe ratio indicates a higher image signal-to-noise ratio, meaning better image quality. Comparing the peak amplitude loss of these five curves allows us to observe the impact of incomplete apertures on the image. Although Case 2: In the conditions listed in Table 1, the velocity of the platform is changed to 10 m/s, and the flight height of the platform was altered to 350 m. These modifications represent the experimental conditions of experiments. The platform used was a multi-rotor unmanned aerial vehicle, named KWT-65, equipped with a Ku-band miniaturized frequency-modulated continuous-wave synthetic aperture radar. This platform was flown approximately 100 times, each flight covering a route length of about 1 km, collecting multiple sets of raw echo data from a specific ground area. Imaging was performed on multiple sets of raw echo data using both traditional imaging methods and the SAI methods of this invention. The comparison of focusing effects is shown in FIGS. 9(*a*)-(*c*). FIG. 9(*a*) represents the imaging results obtained using traditional imaging methods; FIG. 9(*b*) displays the imaging results based on the SAI methods of this invention; and FIG. 9(*c*) illustrates the optical model corresponding to this ground area.

FIG. 9(*a*)-(*c*) demonstrate that the SAI method of this invention has superior focusing effects compared to the traditional imaging method. On the basis of the optical image of the target, it can be seen that the target presents a horizontal "H" shape. The imaging result using the SAI method of this invention shows a clearer contour of the horizontal "H" shape compared to that obtained using the traditional method. Taking the left side of the horizontal "H"-shaped building as an example, when the radar irradiates the glass, it will penetrate the glass and enter the room. After multiple scattering attenuations, making it impossible to return the echo to the radar, the imaging result will appear black. However, due to the presence of right angles and metals at the edge of the window, there will be a significant reflection, forming bright spots or lines. In the imaging result corresponding to the SAI method of this invention, the floor intervals can be clearly observed through the black areas between the bright spots. In the imaging result corresponding to the traditional imaging method, the bright spots are blurred together, making it impossible to clearly observe the glass between the floors. Also, there is a road on the upper left side of the horizontal "H"-shaped building; using the SAI method of this invention, the edge of the road can be clearly seen, whereas the contour of the road edge obtained by the traditional imaging method is not very clear and has extra longitudinal stripes. Moreover, the contour of the garden around the horizontal "H"-shaped building is also clearer in the imaging results of this invention. The overall signal-to-noise ratio of the image is also superior to the traditional method. Furthermore, after multiple/variety of flight tests, it is verified that this method has good focusing effects on the imaging of 90% of the echo data, while the traditional method has good focusing effects on about 35% of the images. For the same scale of image (12500×8192) on the same computer platform, the imaging time of this method is about 320 s, while the imaging time of the traditional method is about 5200 s, speeding up by about 16 times.

Figure 10A:
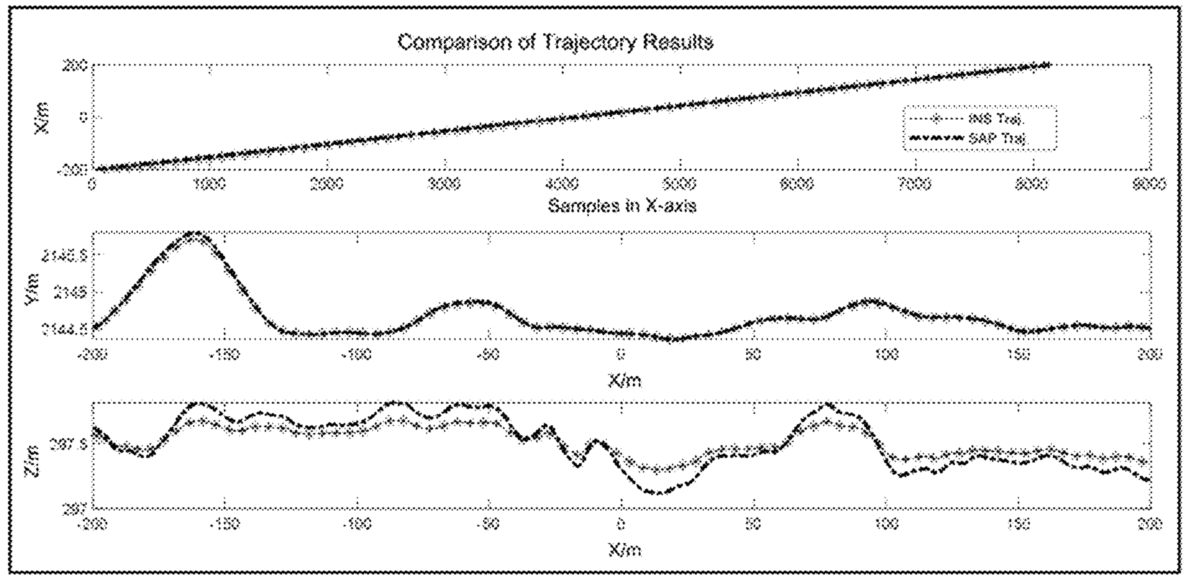
FIGS. 10(*a*)-(*b*). Comparison of estimated platform trajectory curves with inertial navigation system measurement trajectory curves and error curve plot in an embodiment of the present invention.
Figure 10B:
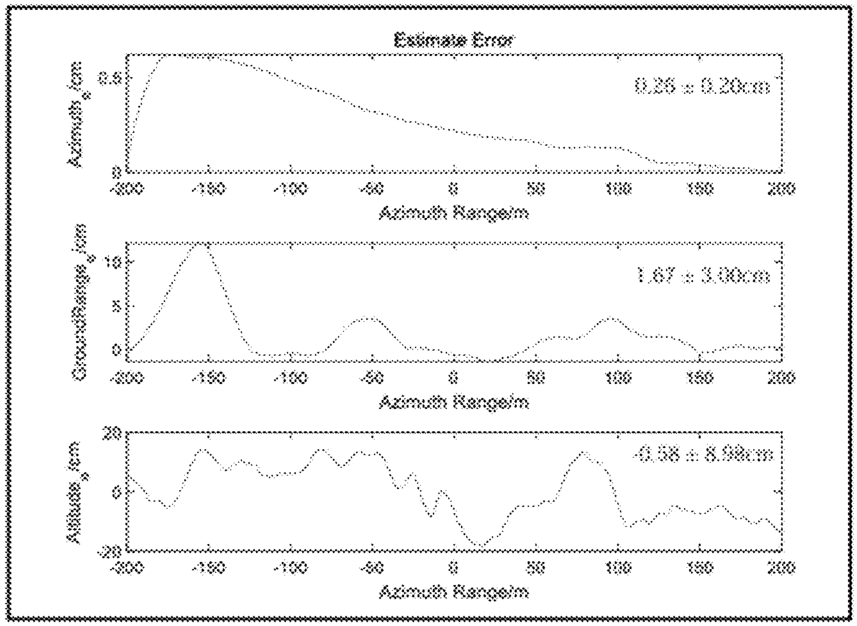

Case 3: Processing the experimental data under case 2, images were obtained, and concurrently, the trajectory of the platform could be estimated. The comparison between the trajectory estimated using the SAI method of this invention and the trajectory collected using inertial navigation equipment is shown in FIGS. 10(*a*)-(*b*). FIG. 10(*a*) displays the comparison between the estimated trajectory of this invention and the trajectory captured by the inertial navigation equipment, presented respectively from top to bottom in terms of azimuth dimension, range dimension, and elevation dimension. The broken line represents the measurement results of the inertial navigation equipment, and the solid line with asterisks therein represents the estimated trajectory results of this invention. It can be observed that the two essentially overlap in azimuth, where the high pulse repetition frequency of the multi-rotor platform ensures minor errors in azimuth dimension. In the range dimension, there are slight deviations between the two, with the broken line slightly off at the edges of the solid line with asterisks therein, particularly at the three peaks with larger fluctuations, where deviations in the broken line are noticeable. In terms of elevation, the deviation between the broken and solid lines appears somewhat larger. Since the estimation method of this invention is based on two-dimensional images, some errors accumulate in the elevation dimension. FIG. 10(*b*) presents the estimation error curves of the SAI method of this invention, displaying deviations in the azimuth dimension, range dimension, and elevation dimension to be approximately at the centimeter-level, centimeter-level, and decimeter-level, respectively, achieving a level close to that of inertial navigation.

The Function and Effect of the Embodiment

According to the segmented aperture imaging and positioning method of a multi-rotor unmanned aerial radar, the method primarily comprising: 1) on the basis of an unmanned aerial vehicle-borne synthetic aperture radar system, acquiring a target echo; 2) on the basis of an echo signal, estimating the motion state of a manoeuvring platform; 3) on the basis of the motion state of the platform, segmenting the echo signal; 4) on the basis of the motion state of the platform, performing motion compensation on each echo signal segment; 5) performing two-dimensional Fourier transform on each compensated echo signal segment to obtain a two-dimensional spectrum, and using a series inversion method to decompose the two-dimensional spectrum to obtain a phase filter of each segment; 6) multiplying the two-dimensional spectrum of each segment by the phase filter corresponding to said segment, and then performing two-dimensional inverse Fourier transform on the two-dimensional spectrum to obtain an image of each segment; 7) performing geometric correction on the images of each segment, and then splicing the images of each segment to obtain a full-aperture imaging result; and 8) splicing the trajectory of each segment of the platform to obtain complete trajectory coordinates of the platform. In this embodiment, a method based on the estimation of platform motion parameters from the phase history of the echo signal and segmenting the echo signals is employed. This allows for precise compensation of platform motion errors, resulting in enhanced imaging focus and a high success rate in image acquisition. It improves the efficiency of data collection for multi-rotor unmanned aerial vehicle-drone platforms, enabling effective high-resolution imaging for synthetic aperture radar systems on multi-rotor unmanned aerial vehicle-drone platforms. Simultaneously, this method can calculate the three-dimensional coordinates of the platform trajectory during the imaging process, achieving effective platform positioning. This has applications in drone navigation, providing possibilities for the future development of intelligent, integrated detection systems.

Compared to Prior Art, the Following Advantages are Evident:

Compared to traditional airborne synthetic aperture radar imaging algorithms, this invention considers the relationship between platform motion and signal phase. As a result, it is suitable for synthetic aperture radar imaging systems on multi-rotor unmanned aerial vehicle platforms that lack inertial navigation systems or are equipped with low-precision inertial navigation systems devices.

Compared to traditional airborne synthetic aperture radar imaging algorithms, this invention considers the slant effects caused by variations in the attitude angles of the unmanned aerial vehicle platform and compensates for the coupled phase between range and azimuth, thereby improving image focusing quality. Consequently, this method is suitable for synthetic aperture radar imaging systems on unmanned aerial vehicle platforms that do not employ antenna servo mechanisms.

Compared to traditional airborne synthetic aperture radar imaging algorithms, this invention utilizes the method of phase filter multiplication instead of interpolation. This approach enhances the imaging speed for each segment, thus improving the efficiency of single-pass imaging within each segment.

Compared to traditional airborne synthetic aperture radar imaging algorithms, this invention adopts a method of parallel imaging of each segment and then splicing it into a complete image to obtain the image, which improves the imaging speed of the complete image.

Furthermore, experimental validation has demonstrated that the embodiment of the present invention, which proposes a segmented aperture imaging (SAI) method for multi-rotor unmanned aerial vehicle-borne synthetic aperture radar, achieves high imaging resolution and fast computational speeds. Concurrently, it enables the estimation of platform trajectory, reducing the algorithm's dependence on hardware equipment, thus indicating that this invention can be effectively applied to synthetic aperture radar imaging systems on small and maneuverable platforms.

In this embodiment, a detailed derivation of the relationship between platform motion parameters and echo phase has been carried out. This allows for motion compensation and imaging without reliance on inertial navigation equipment by considering the second-order expansion of the two-dimensional spectrum in squint views. Through simulations, the point spread function curves of each segment, the complete image, and the traditional imaging algorithm were compared in this embodiment. Experimental validations contrasting the imaging results of the proposed method and traditional algorithms have been conducted, proving that this embodiment can effectively achieve high-resolution imaging for multi-rotor unmanned aerial vehicle-drone platform synthetic aperture radar systems.

The aforementioned embodiments are preferred examples of the present invention and are not intended to limit the scope of protection of the invention.

The invention claimed is:

1. A segmented aperture imaging method of a multi-rotor unmanned aerial vehicle-borne synthetic aperture radar, for segmented aperture imaging based on a raw echo signal of the multi-rotor unmanned aerial vehicle-borne synthetic aperture radar, comprising:

performing a range pulse compression on the raw echo signal $s(t, \eta)$ to obtain a range pulse compression signal $s_{RC}(t, \eta)$ based on a phase history $\varphi(\eta)$ of scattering points in the range pulse compression signal $s_{RC}(t, \eta)$, where t is a fast time in a range dimension and $\eta$ is a slow time in an azimuth dimension;

calculating an estimated velocity $\hat{v}$ and an estimated squint angle of the beam center $\hat{\theta}$ of a manoeuvring platform;

segmenting the range pulse compression signal $s_{RC}(t, \eta)$ into N segments based on a direction of the estimated velocity $\hat{v}$, each segment corresponding to a segmented pulse compression signal $s_{RC,i}(t, \eta)$, where i=1 . . . N;

calculating a phase compensation amount $\varphi_{m,i}$ of each segmented pulse compression signal $s_{RC,i}(t, \eta)$ corresponding to said each segment based on the estimated velocity $\hat{v}$ and the estimated squint angle of the beam center $\hat{\theta}$;

multiplying said each segmented pulse compression signal $s_{RC,i}(t, \eta)$ by a motion error compensation filter $H_{MC,i}=\exp(-j\varphi_{m,i})$, where an imaginary unit $j=\sqrt{-1}$, to obtain N compensated echo signal of said each segment denoted as $s_{MC,i}(t, \eta)$;

performing a two-dimensional Fourier transform on each compensated signal $s_{MC,i}(t, \eta)$ to obtain a two-dimensional spectrum $s_{MC,i}(f, f_d)$;

decomposing the two-dimensional spectrum $s_{MC,i}(f, f_d)$ of said each segment utilizing a series inversion method to construct an azimuth compression filter $H_{AC,i}$, where f represents a frequency corresponding to the fast time in the range dimension and $f_d$ represents a Doppler frequency corresponding to the slow time in the azimuth dimension;

multiplying the two-dimensional spectrum $s_{MC,i}(f, f_d)$ by the azimuth compression filter $H_{AC,i}$, and then performing a two-dimensional inverse Fourier transform to obtain N imaging results, represented as $s_{IMG,i}(t, \eta)$ for said each segment; and sequentially, for overlapping areas in an imaging result $s_{IMG,i}(t, \eta)$ corresponding to adjacent segments, aligning and coherently integrating envelopes in the range dimension where focus points are located, and, for non-overlapping areas, a final imaging result, denoted as $S_{all}$, is obtained by splicing.

2. The segmented aperture imaging method of claim 1, further comprising for the scattering points in the range pulse compression signal $s_{RC}(t, \eta)$, performing a second-order fitting on the phase history $\varphi(\eta)$ to obtain a phase history of the scattering points in the slow time in the azimuth dimension as $\varphi(\eta)=\beta\eta^2+\alpha\eta+\varphi_0+o(\eta)$, where $o(\eta)$ represents a higher order phase error and $\varphi_0$ is a constant phase term, and based on coefficients of a second-order term $\beta$ and a first-order term $\alpha$, the estimated velocity of the manoeuvring platform is calculated as $$\hat{v} = \sqrt{\left(\frac{\lambda\alpha}{4\pi}\right)^2 + \frac{-\lambda\beta\hat{R}}{2\pi}}$$

and the estimated squint angle of the beam center is calculated as $$\hat{\theta} = \tan^{-1}\left(\frac{\lambda\alpha}{4\pi} / \sqrt{\frac{-\lambda\beta\hat{R}}{2\pi}}\right),$$

where $\Delta$ is a wavelength of a system transmitted signal and $\acute{R}$ is an estimated value of a system reference range.

3. The segmented aperture imaging method of claim 1, wherein the step of segmenting sequentially divides the range pulse compression signal $s_{RC}(t, \eta)$ into N segments with consistent velocity directions; and after determining whether a length of said each segment is less than one synthetic aperture length, if the length of said each segment is determined to be less than one synthetic aperture length, said each segment is extended on both sides to one synthetic aperture length, thereby to obtain N segmented pulse compression signals.

4. The segmented aperture imaging method of claim 1, wherein the phase compensation amount of said each segment is defined as $$\varphi_{m,i} = \frac{4\pi}{\lambda}(\hat{R} - R_0 + (\hat{v} - v_0)\sin\theta_0\,\eta),$$

where $R_0$ is a mean value of said each segment $\hat{R}$ and $\theta_0$% is a mean value of the estimated squint angle of beam center of said each segment.

5. The segmented aperture imaging method of claim 1, wherein the azimuth compression filter of said each segment is definded as $$H_{AC,i} = \exp\left[-j\left(\frac{\pi c\hat{R}}{2\hat{v}^2\cos^2\hat{\theta}}\cdot\frac{f_d^2}{f_c^2}+\frac{\pi c\hat{R}}{2\hat{v}^2\cos^2\hat{\theta}}\cdot\frac{f}{f_c^2}f_d^2\right)\right],$$

where $f_c$ is a carrier frequency of a system transmitted signal and c is the speed of light.

6. The segmented aperture imaging method of claim 1, further comprising applying a geometric correction to the imaging result $s_{IMG,i}$ (t, η) corresponding to the adjacent segments to obtain a corrected imaging result $$s_{IMG,i}^{GC};$$

rotating the corrected imaging result $$s_{IMG,i}^{GC}$$

by $\hat{\theta}-\theta_0$ degree to obtain the corrected imaging result $$s_{IMG,i}^{GC}$$

perpendicular to a trajectory of the manoeuvring platform in a slant distance, where $\theta_0$ is a mean value of the estimated squint angle of beam center of said each segment; and aligning consecutive overlapping areas of the corrected imaging result $$s_{IMG,i}^{GC}$$

corresponding to the adjacent segments in the envelopes.

7. The segmented aperture imaging method of claim 6, wherein applying the geometric correction to the imaging result $s_{IMG,i}$ (t, η) comprises:

performing the two-dimensional Fourier transform in the azimuth dimension on the imaging result $s_{IMG,i}$ (t, η) to obtain a range-Doppler domain image $s_{IMG,i}$ (t, $f_d$) of said each segment;

based on characteristics of the two-dimensional Fourier transform and a geometric structure of a target space, constructing an expression for a tilt correction filter $$H_{GC-1} = \exp\left(j2\pi f_d\frac{l\tan\theta_0}{v_0}\right)$$

to correct a tilt of an image, where l represents a range scale of a building;

multiplying the range-Doppler domain image $s_{IMG,i}$ (t, $f_d$) by the tilt correction filter $H_{GC-1}$ to obtain a tilt-corrected frequency domain image $$s_{IMG,i}^{GC-1}(t, f_d);$$

performing the two-dimensional inverse Fourier transform in the azimuth dimension on the tilt-corrected frequency domain image $$s_{IMG,i}^{GC-1}(t, f_d)$$

to obtain a tilt-corrected corrected time domain image $$s_{IMG,i}^{GC-1}(t, \eta);$$

based on the geometric structure of the target space, obtaining an expression for the stretch/compression factor:

$$t = \frac{l\sin\theta_0}{\sqrt{\hat{R}^2+H^2}-R_0}\frac{1}{\tan\theta_0}t;$$

substituting the stretch/compression factor expression into the tilt-corrected time domain image $$s_{IMG,i}^{GC-1}(t, \eta)$$

to obtain a deformation-corrected time domain image $$s_{IMG,i}^{GC-2}(t, \eta);$$

performing the two-dimensional Fourier transform in the range dimension on the deformation-corrected time domain image $$s_{IMG,i}^{GC-2}(t, \eta)$$

to obtain a deformation-corrected frequency domain image $$s_{IMG,i}^{GC-2}(f, \eta)$$

of said each segment;

based on the characteristics of the two-dimensional Fourier transform and the geometric structure of the target space, constructing an expression for a position correction filter $$H_{GC-3}=\exp\left(j2\pi f\frac{2(\hat{R}/\cos\theta_0-\hat{R})}{c}\right)$$

to correct an image translation;

multiplying the deformation-corrected frequency domain image $$s_{IMG,i}^{GC-2}(f,\eta)$$

by the position correction filter $H_{GC-3}$ to obtain a geometrically corrected frequency domain image $$s_{IMG,i}^{GC-3}(f,\eta)$$

of said each segment;

performing the two-dimensional inverse Fourier transform in the range dimension on the geometrically corrected frequency domain image $$s_{IMG,i}^{GC-3}(f,\eta)$$

of said each segment to obtain a geometrically corrected time-domain image $$s_{IMG,i}^{GC}(t,\eta)$$

of said each segment;

rotating the geometrically corrected time-domain image $$s_{IMG,i}^{GC}(t,\eta)$$

counterclockwise by $\hat{\theta}-\theta_0$ degrees to obtain a to-be-spliced time-domain image $$s_{IMG,i}^{GC-p}(t,\eta)$$

which is perpendicular to the trajectory of the manoeuvring platform in the slant distance;

sequentially aligning the envelopes in overlap regions of adjacent to-be-spliced time-domain images $$s_{IMG,i}^{GC-p}(t,\eta);$$

and performing coherent integration in the overlapping regions of the adjacent to-be-spliced time-domain images and sequentially connecting the non-overlapping regions of the adjacent to-be-spliced time-domain images, to complete a sub-aperture splicing and to obtain the final imaging result $S_{all}$.

8. The segmented aperture imaging method of claim 1, wherein the estimated velocity $\hat{v}$ and the estimated squint angle of the beam center $\hat{\theta}$ calculations comprise:

calculating a Doppler frequency modulation slope $K_a$ and a Doppler center $f_{dc}$, as follows:

$$K_a=\frac{d^2\varphi(\eta)}{2\pi d\eta^2},$$

$$f_{dc}=\frac{d\varphi(\eta)}{2\pi d\eta},$$

where $$\frac{d(\cdot)}{d\eta}$$

denotes the derivation of (•) with respect to the slow time n in the azimuth where dimension;

designating a space constituted by the raw echo signal as a signal space for the range pulse compression signal $s_{RC}(t,\eta)$;

performing a second-order fitting on the phase history $\varphi(\eta)$ to obtain a phase history $\varphi(\eta)$ of the scattering points in the signal space as $\varphi(\eta)=\beta\eta^2+\alpha\eta+\varphi_0+o(\eta)$, where $\beta$ is a coefficient of the second-order term, $\alpha$ is a coefficient of the first-order term, $\varphi_0$ is a constant phase term and $o(\eta)$ represents a higher-order phase error;

substituting the phase history $\varphi(\eta)$ of the scattering points in the signal space into the $K_\alpha$ and the $f_{dc}$ to respectively obtain $$K_a=\frac{\beta}{\pi}\text{ and }f_{dc}=\frac{\alpha}{2\pi}$$

in the signal space;

defining a space constructed by actual positions of a target and the manoeuvring platform as a target space, based on spatial geometric relationships, to obtain a phase history $\varphi(\eta)$ in the target space as $$\varphi(\eta)=\frac{4\pi}{\lambda}\left[\frac{v^2\cos^2\theta}{2R_0}\eta^2-v\sin\theta\eta+R_0\right],$$

where v represents a velocity of the manoeuvring platform, $\theta$ represents a squint angle of the beam center caused by a movement of the manoeuvring platform, $R_0$ represents a closest range between the target and the manoeuvring platform and A represents a wavelength of a system transmitted signal;

substituting the phase history $\varphi(\eta)$ in the target space into the $K_\alpha$ and the $f_{dc}$ to respectively obtain $$K_a=-\frac{2v^2\cos^2\theta}{\lambda R}\text{ and }f_{dc}=\frac{2v\sin\theta}{\lambda}$$

in the target space; and comparing the $K_\alpha$ in the signal space with the $K_\alpha$ in the target space, and comparing the $f_{dc}$ in the signal space with the $f_{dc}$ in the target space, the estimated velocity, the estimated squint angle of the beam center, and an estimated range are obtained as follow:

$$\hat{v}=\sqrt{\left(\frac{\lambda\alpha}{4\pi}\right)^2+\frac{-\lambda\beta\hat{R}}{2\pi}},$$

$$\hat{\theta}=\tan^{-1}\left(\frac{\lambda\alpha}{4\pi}\Big/\sqrt{\frac{-\lambda\beta\hat{R}}{2\pi}}\right),\text{ and}$$

$$\hat{R}=R_0+\frac{\varphi_0\lambda}{4\pi}-\frac{\lambda\alpha}{8\pi}.$$

9. The segmented aperture imaging method of claim 1, wherein decomposing the two-dimensional spectrum $s_{MC,i}$ (f, $f_d$) of said each segment comprises:

based on a stationary phase method, obtaining an expression of the two-dimensional spectrum $s_{MC,i}$ (f, $f_d$) of said each segment as $$s_{MC,i}(f,f_d)=\exp\left[-j\left(-\frac{4\pi R}{c}(f+f_c)+\frac{\pi cR}{2v^2\cos^2\theta}\cdot\frac{1}{f+f_c}f_d^2\right)\right],$$

where $f_c$ represents a carrier frequency of a system transmitted signal and c represents the speed of light;

decomposing the expression of the two-dimensional spectrum $s_{MC,i}$ (f, $f_d$) to obtain a two-dimensional spectrum expression of said each segment that eliminates coupling terms between f and $f_d$a:

$$s_{MC,i}(f,f_d)=\exp\left[-j\left(-\frac{4\pi R}{c}(f+f_c)+\frac{\pi cR}{2v^2\cos^2\theta}\cdot\frac{f_d^2}{f_c^2}+\frac{\pi cR}{2v^2\cos^2\theta}\cdot\frac{f}{f_c^2}f_d^2\right)\right];$$

deriving an expression of an ideal phase filter $$H_i=\exp\left[-j\left(\frac{\pi cR}{2v^2\cos^2\theta}\cdot\frac{f_d^2}{f_c^2}+\frac{\pi cR}{2v^2\cos^2\theta}\cdot\frac{f}{f_c^2}f_d^2\right)\right]$$

based on the two-dimensional spectrum expression; and substituting the estimated velocity $\hat{v}$, the estimated squint angle of the beam center $\hat{\theta}$ and an estimated reference range $\hat{R}$ into the expression of the ideal phase filter to obtain the azimuth compression filter of said each segment:

$$H_{AC,i}=\exp\left[-j\left(\frac{\pi c\hat{R}}{2\hat{v}^2\cos^2\hat{\theta}}\cdot\frac{f_d^2}{f_c^2}+\frac{\pi c\hat{R}}{2\hat{v}^2\cos^2\hat{\theta}}\cdot\frac{f}{f_c^2}f_d^2\right)\right].$$

10. A segmented aperture positioning method of a multi-rotor unmanned aerial vehicle-borne synthetic aperture radar, for calculating a flight trajectory of an unmanned aerial vehicle based on a raw echo signal from the multi-rotor unmanned aerial vehicle-borne synthetic aperture radar, comprising:

performing a range pulse compression on the raw echo signal s(t, η) to obtain the range pulse compression signal $s_{RC}$ (t, η) based on a phase history φ(η) of scattering points in the $s_{RC}$(t, η), where t is a fast time in a range dimension, and η is a slow time in an azimuth dimension;

calculating an estimated velocity $\hat{v}$ and an estimated squint angle of the beam center $\hat{\theta}$ of a manoeuvring platform;

segmenting the range pulse compression signal $s_{RC}$(t, η) into N segments based on a direction of the estimated velocity $\hat{v}$, each segment corresponding to a segmented pulse compression signal $s_{RC,i}$ (t, η), where i=1 . . . N;

calculating platform trajectory coordinates $$[X_k^i,Y_k^i,Z_k^i]$$

for i-th segment based on the estimated velocity $\hat{v}$ and estimated the squint angle of beam center $\hat{\theta}$, where k=1 . . . M and M is a length of said each segment in an azimuth direction, as follows:

$$X_k^i=\int\hat{v}\eta d\eta,$$

$$Y_k^i=0,$$

$$Z_k^i=\hat{R}\cos\hat{\theta}\cos\theta_{in},$$

where $\theta_{in}$ represents an angle between a beam direction of the multi-rotor unmanned aerial vehicle-borne synthetic aperture radar and a normal direction of the ground plane;

extracting three scattering points in adjacent regions between the i-th and (i−1)-th segments, the coordinates of the three scattering points in the i-th segment are denoted as $$[Q_1^i,Q_2^i,Q_3^i],$$

and the coordinates of the scattering points in the (i−1)-th segment are denoted as $$[Q_1^{i-1},Q_2^{i-1},Q_3^{i-1}];$$

calculating a rotation matrix γ for the i-th and (i−1)-th segments, based on the coordinates of the scattering points $[Q_1^{i-1},Q_2^{i-1},Q_3^{i-1}]$ and $[Q_1^i,Q_2^i,Q_3^i]$, as follows: $\gamma=[Q_1^{i-1},Q_2^{i-1},Q_3^{i-1}]\cdot[Q_1^i,Q_2^i,Q_3^i]^{-1}$;

rotating the platform trajectory coordinates of the i-th segment utilizing the platform trajectory coordinates of the (i−1)-th segment $$[X_k^{i-1},Y_k^{i-1},Z_k^{i-1}]$$

as a reference to align the platform trajectory coordinates of adjacent segments, as follows:

$$[X_k^{i-1},Y_k^{i-1},Z_k^{i-1}]=\gamma\cdot[X_k^i,Y_k^i,Z_k^i];$$

performing a coherent integration of the platform trajectory coordinates in an overlapping region of the i-th and (i−1)-th segments, and concatenating the platform trajectory coordinates in a non-overlapping region to obtain concatenated trajectory coordinates $$[P_x^i, P_y^i, P_z^i], \text{ as follows: } [P_x, P_y, P_z] = [X_k^i, Y_k^i, Z_k^i] + [X_k^{i-1}, Y_k^{i-1}, Z_k^{i-1}];$$

repeating the steps of extracting the three scattering points, calculating the rotation matrix, rotating the platform trajectory coordinates, performing the coherent integration and concatenating the platform trajectory coordinates until spliced trajectory coordinates $[P_x, P_y, P_z]$ for all segments are obtained, so as to obtain final trajectory coordinates $$[P_x^{all}, P_y^{all}, P_Z^{all}]$$

* * * * *